US011460607B2

(12) United States Patent
Shrekenhamer et al.

(10) Patent No.: US 11,460,607 B2
(45) Date of Patent: Oct. 4, 2022

(54) DYNAMIC FILTER COMPRISING A FIRST AND SECOND METASURFACE FOR SPECTRAL SENSING AND EMITTING SYSTEMS

(71) Applicant: The Johns Hopkins University, Baltimore, MD (US)

(72) Inventors: David B. Shrekenhamer, Bethesda, MD (US); Luke J. Currano, Columbia, MD (US); Konstantinos Gerasopoulos, Odenton, MD (US); Joseph A. Miragliotta, Ellicott City, MD (US); Joshua B. Broadwater, Catonsville, MD (US); Garret T. Bonnema, Silver Spring, MD (US)

(73) Assignee: The Johns Hopkins University, Baltimore, MD (US)

( * ) Notice: Subject to any disclaimer, the term of this patent is extended or adjusted under 35 U.S.C. 154(b) by 621 days.

(21) Appl. No.: 16/503,521

(22) Filed: Jul. 4, 2019

(65) Prior Publication Data

US 2020/0014464 A1 Jan. 9, 2020

Related U.S. Application Data

(60) Provisional application No. 62/694,066, filed on Jul. 5, 2018.

(51) Int. Cl.
*G02B 1/00* (2006.01)
*G02B 26/00* (2006.01)
(Continued)

(52) U.S. Cl.
CPC .............. *G02B 1/002* (2013.01); *G01S 3/781* (2013.01); *G02B 5/28* (2013.01); *G02B 5/281* (2013.01);
(Continued)

(58) Field of Classification Search
CPC .... H04B 10/2941; G01N 21/00; G01S 3/781; G01S 1/7032; G02B 1/002; G02B 27/16;
(Continued)

(56) References Cited

U.S. PATENT DOCUMENTS

| 7,474,456 B2 | 1/2009 | Wang et al. | |
|---|---|---|---|
| 2005/0167597 A1* | 8/2005 | Yokura | G01J 3/26 250/343 |

(Continued)

OTHER PUBLICATIONS

R. Glenn Sellar, et al., "Classification of imaging spectrometers for remote sensing applications," Optical Engineering vol. 44(1), 013602, pp. 1-3 (Jan. 2005).

(Continued)

*Primary Examiner* — Jennifer D Bennett
(74) *Attorney, Agent, or Firm* — Noah J. Hayward

(57) ABSTRACT

An apparatus includes a substrate, a first patterned layer, and a second patterned layer. The first patterned layer may be coupled to the substrate and may have a first metasurface pattern. The second patterned layer disposed separately from the substrate and the first patterned layer, and may have a second metasurface pattern. Movement of the first patterned layer relative to the second patterned layer may be controllable via control circuitry such that a gap distance of a gap between the first patterned layer and the second patterned layer is changed to cause a transmittance for radiant energy of a selected wavelength passing through the apparatus to change from a first transmittance value to a second transmittance value.

14 Claims, 13 Drawing Sheets

(51) Int. Cl.
*G02B 5/28* (2006.01)
*H04B 10/294* (2013.01)
*G01S 3/781* (2006.01)
*G02B 27/16* (2006.01)
*G01J 3/28* (2006.01)

(52) U.S. Cl.
CPC ........... *G02B 26/001* (2013.01); *G02B 27/16* (2013.01); *H04B 10/2941* (2013.01); *G01J 2003/2826* (2013.01)

(58) Field of Classification Search
CPC ...... G02B 5/281; G02B 26/001; G02B 5/286; G02B 5/28; G01J 5/0802; G01J 2003/2806; G01J 3/2823; G01J 3/0213; G01J 3/0224; G01J 5/59; G01J 2003/2826
See application file for complete search history.

(56) References Cited

U.S. PATENT DOCUMENTS

| | | | |
|---|---|---|---|
| 2012/0170114 A1* | 7/2012 | Domash | G02B 1/002 359/359 |
| 2013/0170018 A1* | 7/2013 | Domash | G02B 26/007 359/320 |
| 2015/0219806 A1* | 8/2015 | Arbabi | G02B 5/1842 29/436 |
| 2018/0248268 A1* | 8/2018 | Shvets | H01Q 15/0086 |

OTHER PUBLICATIONS

R. Glenn Sellar, et al., "Comparison of relative signal-to-noise ratios of different classes of imaging spectrometer," Appl. Optics vol. 44, No. 9, pp. 1614-1624 (Mar. 2005).

Lee W. Schumann, et al., "Infrared hyperspectral imaging Fourier transform and dispersive spectrometers: comparison of signal-to-noise-based performance," Proc. SPIE vol. 4480, Imaging Spectrometry VII, pp. 1-14 (Jan. 17, 2002).

Dimitrus G. Manolakis, et al., "Long-Wave Infrared Hyperspectral Remote Sensing of Chemical Clouds," IEEE Signal Processing Magazine, pp. 120-141, (Jul. 2014).

X. Prieto-Blanco, et al., "Optical Configurations for Imaging Spectrometers," Computational Intelligence for Remote Sensing, Studies in Computational Intelligence (SCI), vol. 133, pp. 1-25 (2008).

\* cited by examiner

DYNAMIC FILTER COMPRISING A FIRST AND SECOND METASURFACE FOR SPECTRAL SENSING AND EMITTING SYSTEMS

CROSS-REFERENCE TO RELATED APPLICATIONS

This application claims priority to and the benefit of prior-filed, U.S. Provisional Application Ser. No. 62/694,066 filed on Jul. 5, 2018, the entire contents of which are hereby incorporated herein by reference.

TECHNICAL FIELD

Example embodiments relate generally to spectral conditioning systems and, more particularly, relate to dynamic filtering for spectral sensing and emitting systems.

BACKGROUND

Radiant energy sensors and associated sensing and imaging systems have a wide variety of applications. Such systems may be used, for example, to receive and facilitate analyses of radiant energy transmitted though or reflected off of materials or chemicals in an effort to identify the composition of the materials or chemicals. Conventional systems that incorporate interferometers, spectrometers, or other hyperspectral sensors, for example, may be capable of performing such applications, but these systems are expensive, large, heavy, and have high power requirements. As such, conventional systems simply are not feasible for implementation on small remote platforms, such as aerial drones and other unmanned aerial vehicles (UAVs), unmanned terrestrial vehicles such as planetary rovers used in the space program, on board satellites, or the like. Such limitations of conventional systems are particularly problematic for systems that operate in the infrared spectrum and, more specifically, in the mid-wavelength infrared spectrum [i.e., wavelengths from 3 to 8 micrometer (μm)] and the long-wavelength infrared spectrum (i.e., wavelengths from 8 to 15 μm). As such, there is a continued need to develop radiant energy systems and component technologies that can be leveraged by radiant energy systems to increase the breadth of applications where such systems can be used.

BRIEF SUMMARY OF SOME EXAMPLES

According to some example embodiments, an apparatus is provided. The apparatus may include a substrate, a first patterned layer, a second patterned layer, and control circuitry. The first patterned layer may be coupled to the substrate and may include a first pattern. In this regard, the first patterned layer may include a first metasurface. The second patterned layer is disposed separately from the substrate and the first patterned layer, and the second patterned layer may include a second pattern. The second patterned layer may include a second metasurface. The control circuitry may be in communication with the first patterned layer and the second patterned layer. Further, the control circuitry may be configured to control the first patterned layer or the second patterned layer to move the first patterned layer and the second patterned layer into a position such that a gap distance of a gap between the first patterned layer and the second patterned layer is changed to cause a transmittance for radiant energy of a selected wavelength passing through the apparatus to change from a first transmittance value to a second transmittance value.

According to other non-limiting example embodiments, a system includes a radiant energy filter array including a plurality of filter elements arranged in a common plane. The plurality of filter elements may include a first filter element and a second filter element. The system may also include control circuitry in communication with the first filter element and the second filter element. The control circuitry may be configured to control the first filter element the second filter. The system may also include a radiant energy sensor positioned to receive radiant energy passing through the radiant energy filter array. In this regard, the first filter element may include a first microelectromechanical device. The first microelectromechanical device may include a first metasurface and a second metasurface. The first metasurface may be movable towards the second metasurface via an attraction force controlled by the control circuitry to change a transmittance for radiant energy of a first wavelength and controllably pass radiant energy of the first wavelength to the radiant energy sensor. Further, the second filter element may include a second microelectromechanical device. The second microelectromechanical device may include a third metasurface and a fourth metasurface. The third metasurface may be movable towards the fourth metasurface via an attraction force controlled by the control circuitry to change a transmittance for radiant energy of a second wavelength and controllably pass radiant energy of the second wavelength to the radiant energy sensor.

According to additional example embodiments, a method is provided. The method may include providing a substrate and patterning a first metasurface layer onto the substrate. In this regard, the first metasurface layer may include a metal. The method may further include depositing an actuation and anchor member layer onto the first metasurface layer, coating the substrate, the first metasurface layer, and the actuation and anchor member, and depositing a sacrificial gap layer. The method may further include depositing a dielectric spacer layer on the sacrificial gap layer and patterning a second metasurface layer onto the dielectric spacer layer. In this regard, the second metasurface layer may include a metal. The method may further include depositing a dielectric upper beam layer on the second metasurface layer, depositing beam metal on the dielectric upper beam layer, and releasing a microelectromechanical device by removing the sacrificial gap layer.

BRIEF DESCRIPTION OF THE SEVERAL VIEWS OF THE DRAWINGS

Figure 1A:
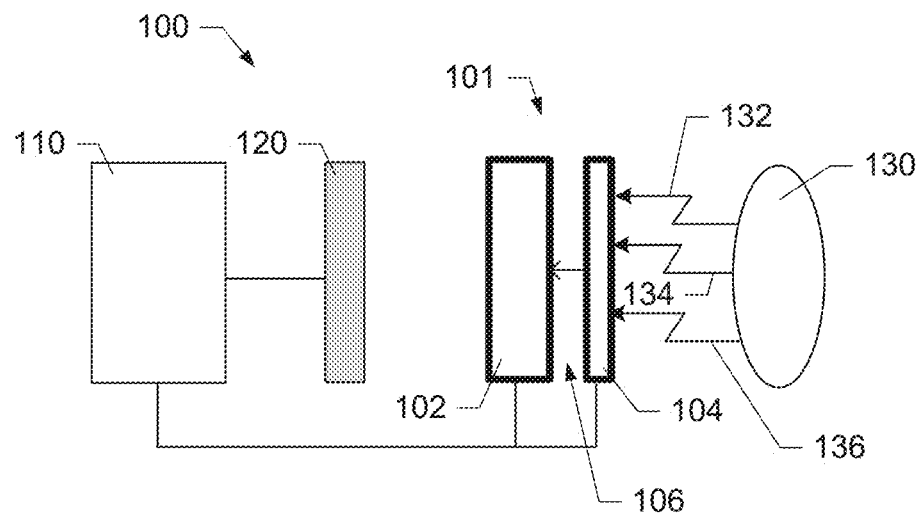
Figure 1B:
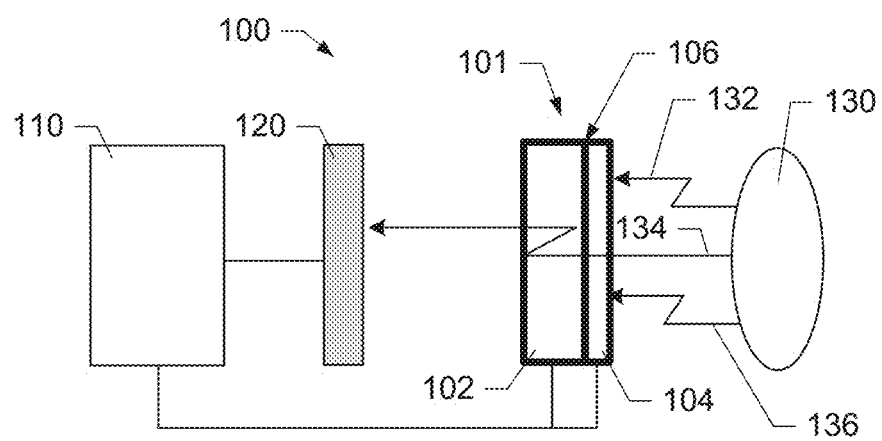
Figure 1C:
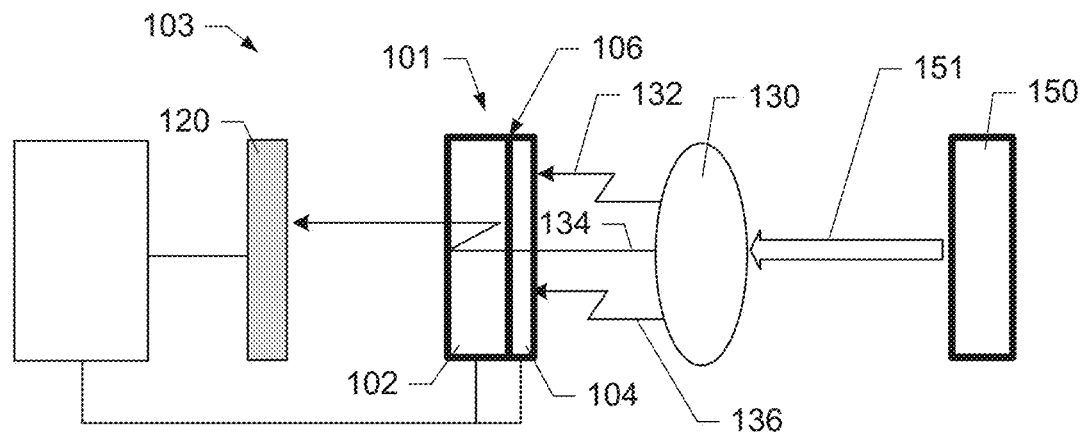
Figure 1D:
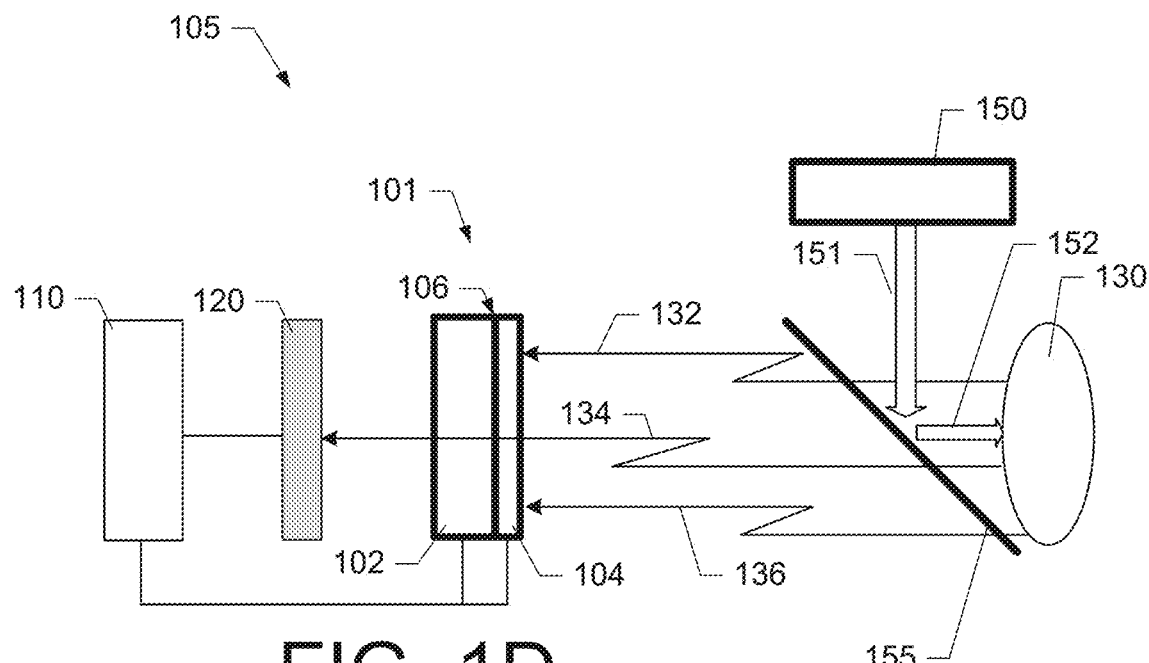
Figure 1E:
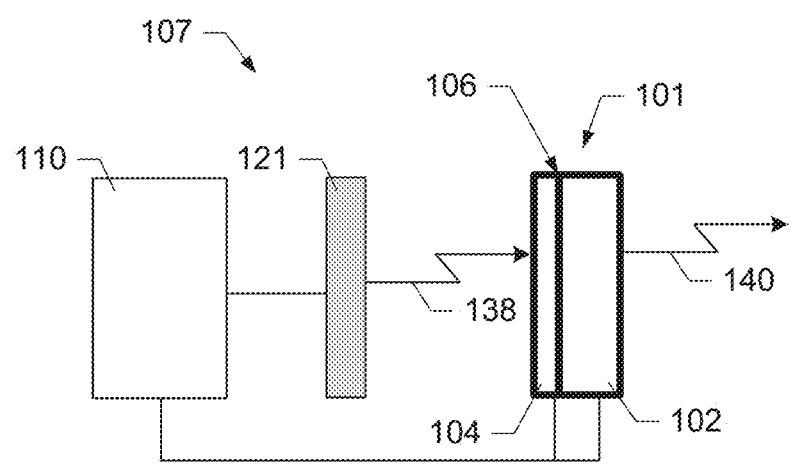
Figure 2A:
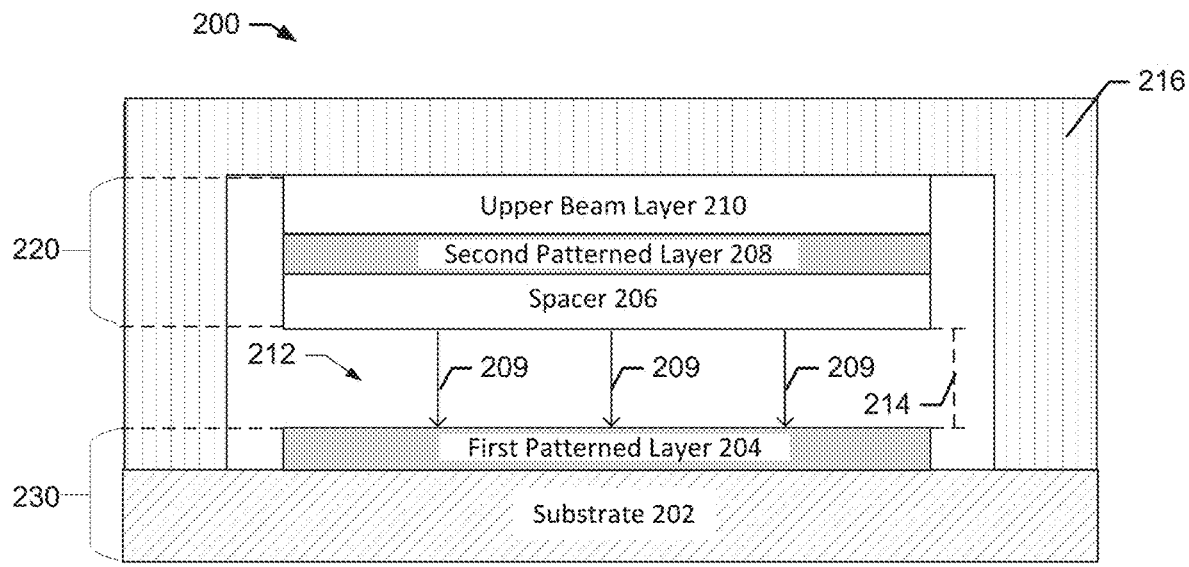
Figure 2B:
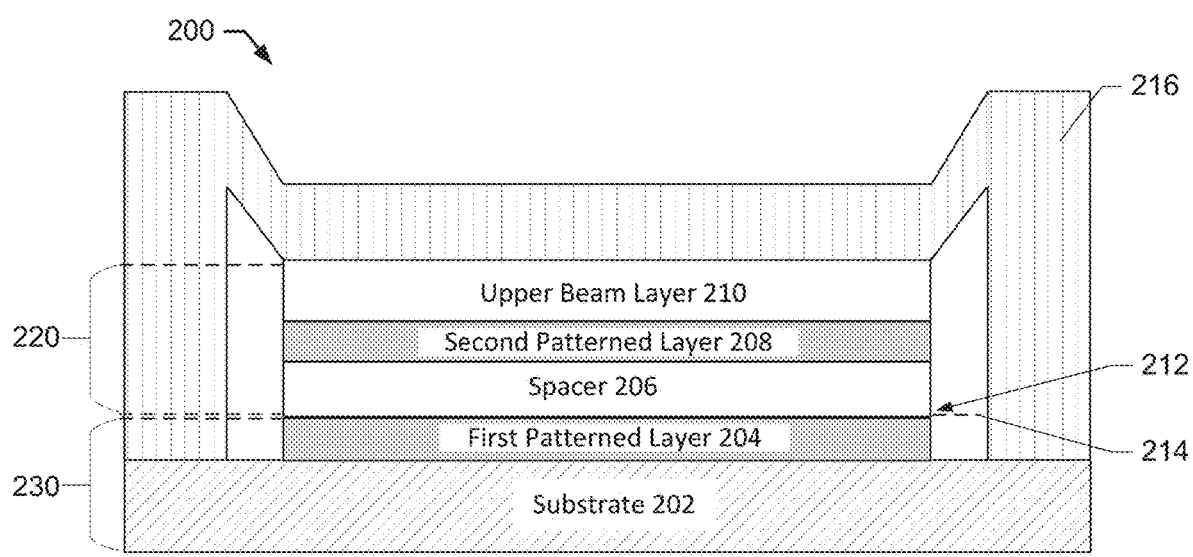
Figure 3A:
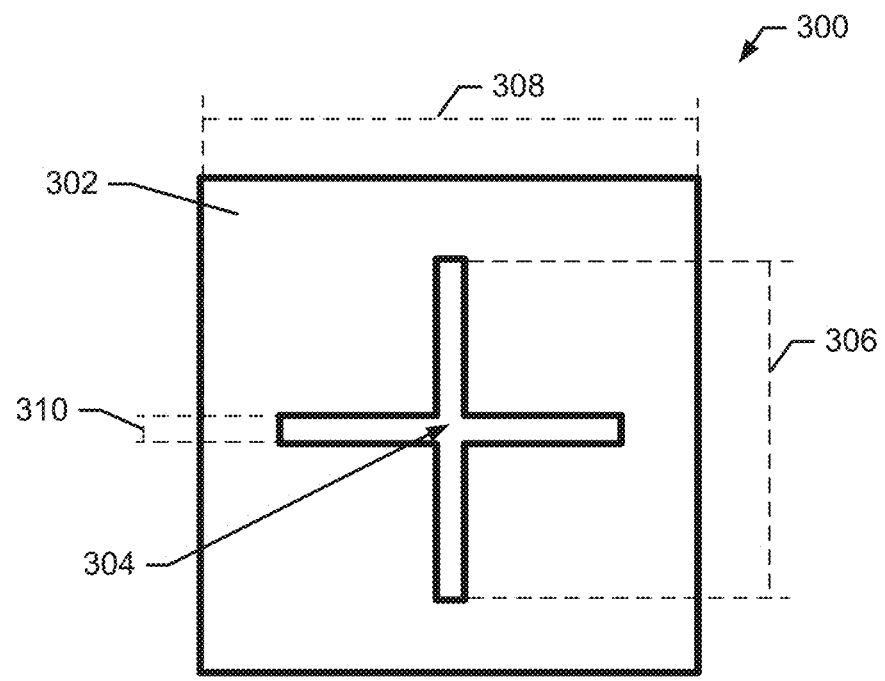
Figure 3B:
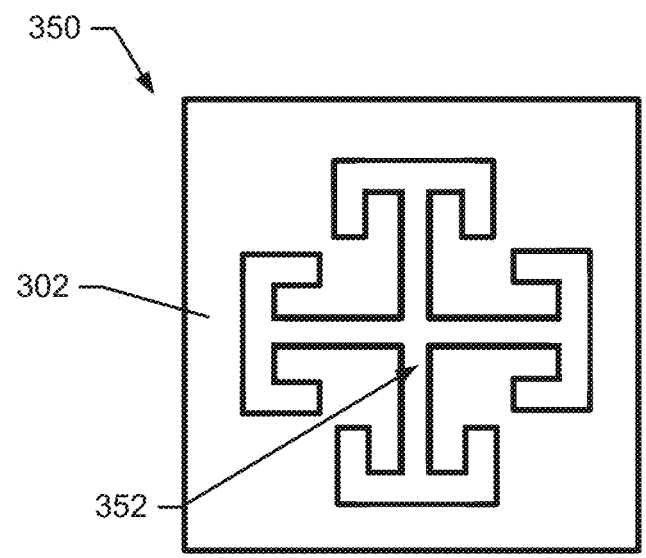
Figure 3C:
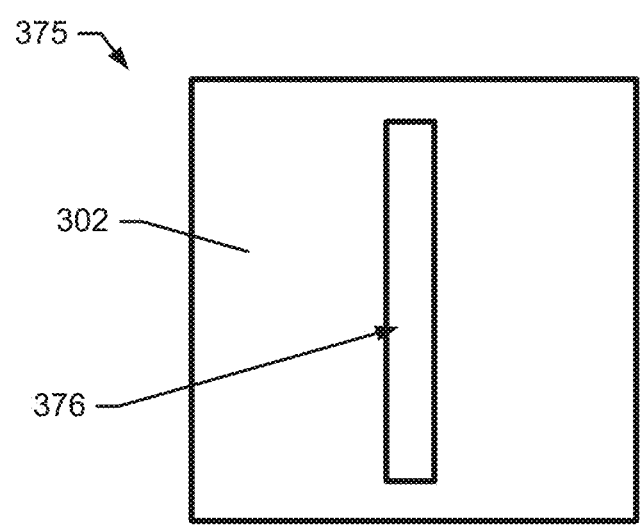
Figure 4:
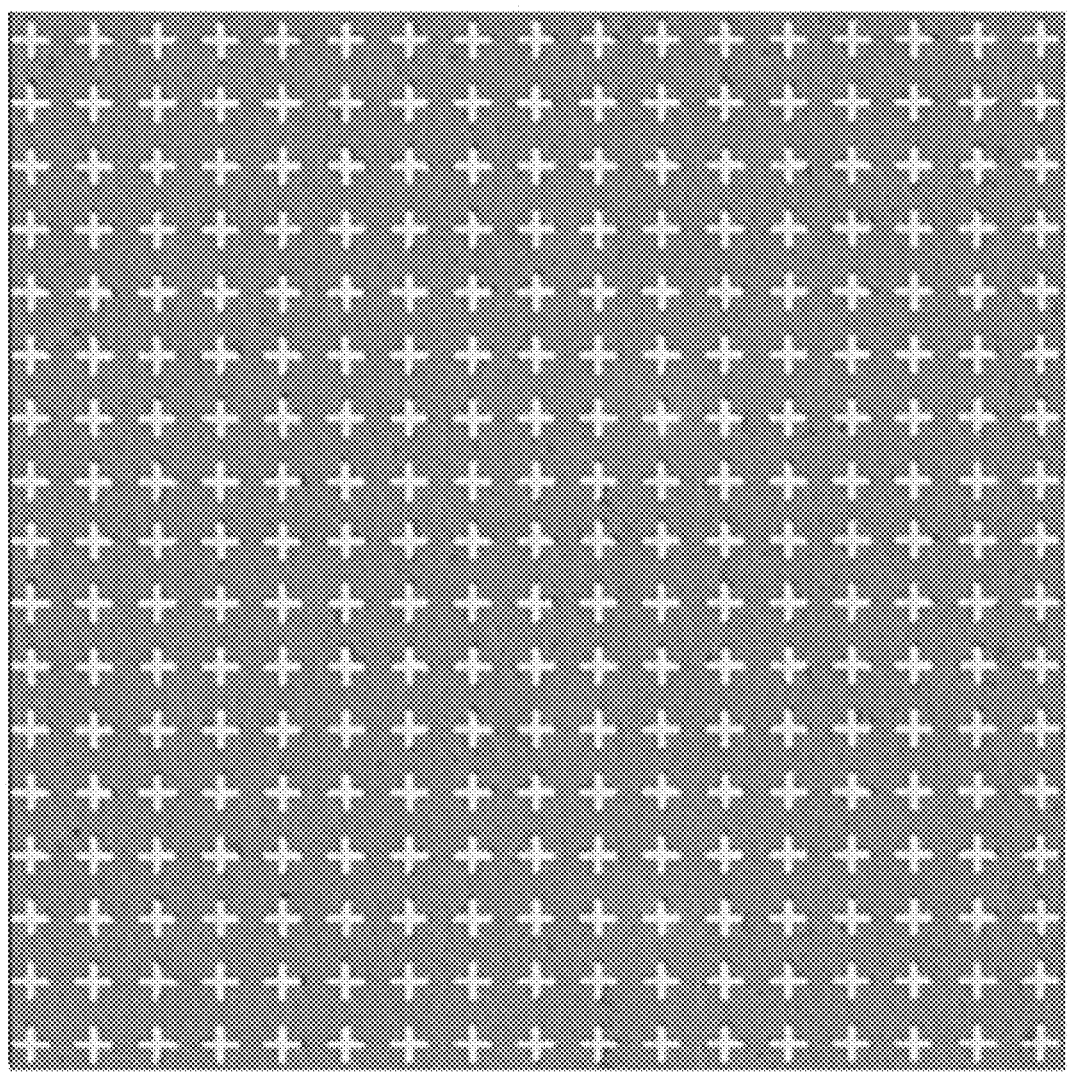
Figure 5:
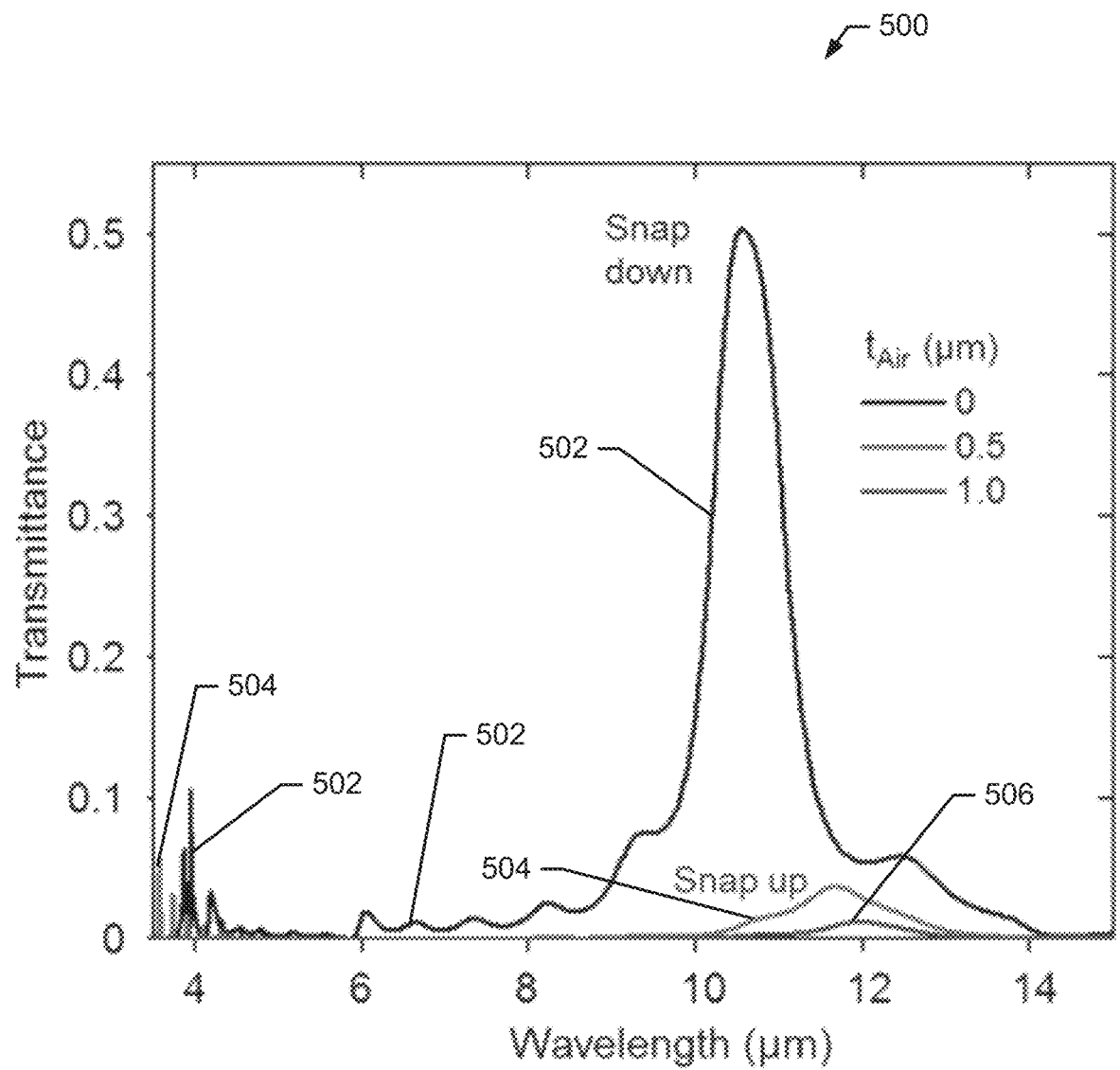
Figure 6:
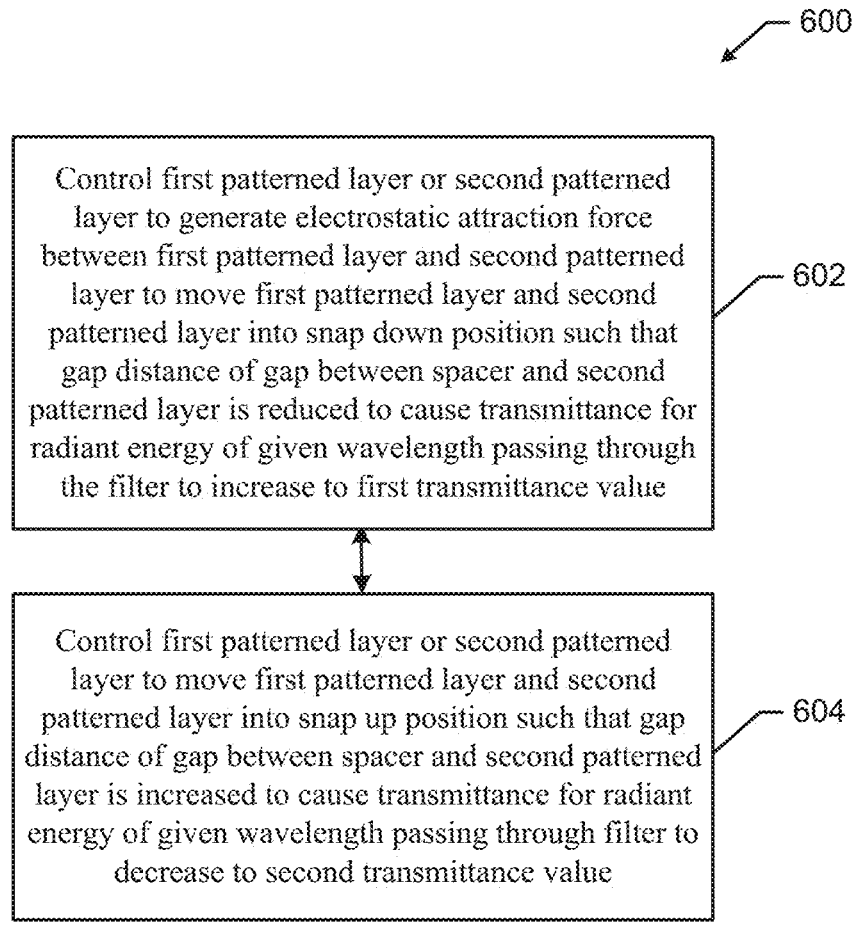
Figure 7:
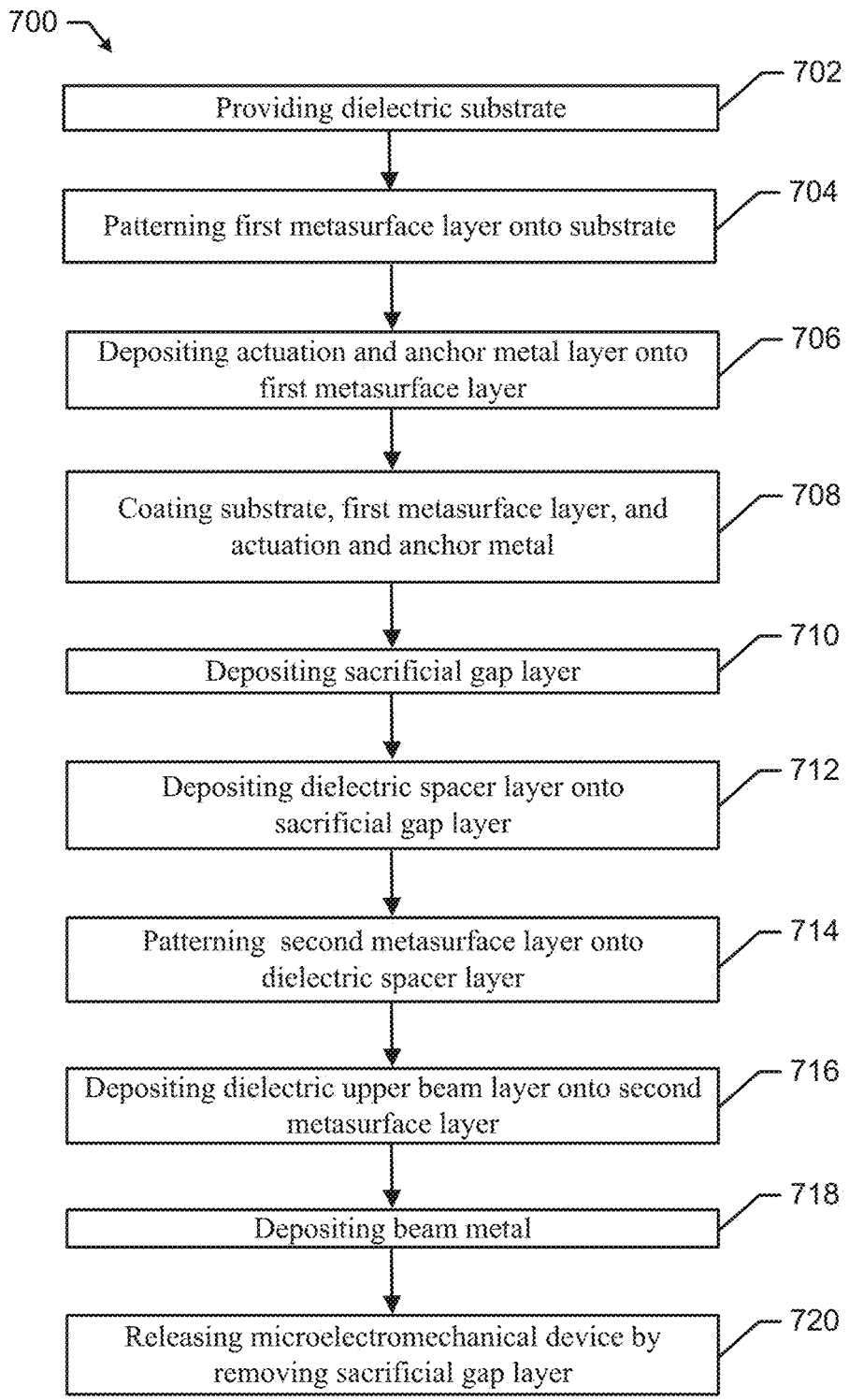
Figure 8:
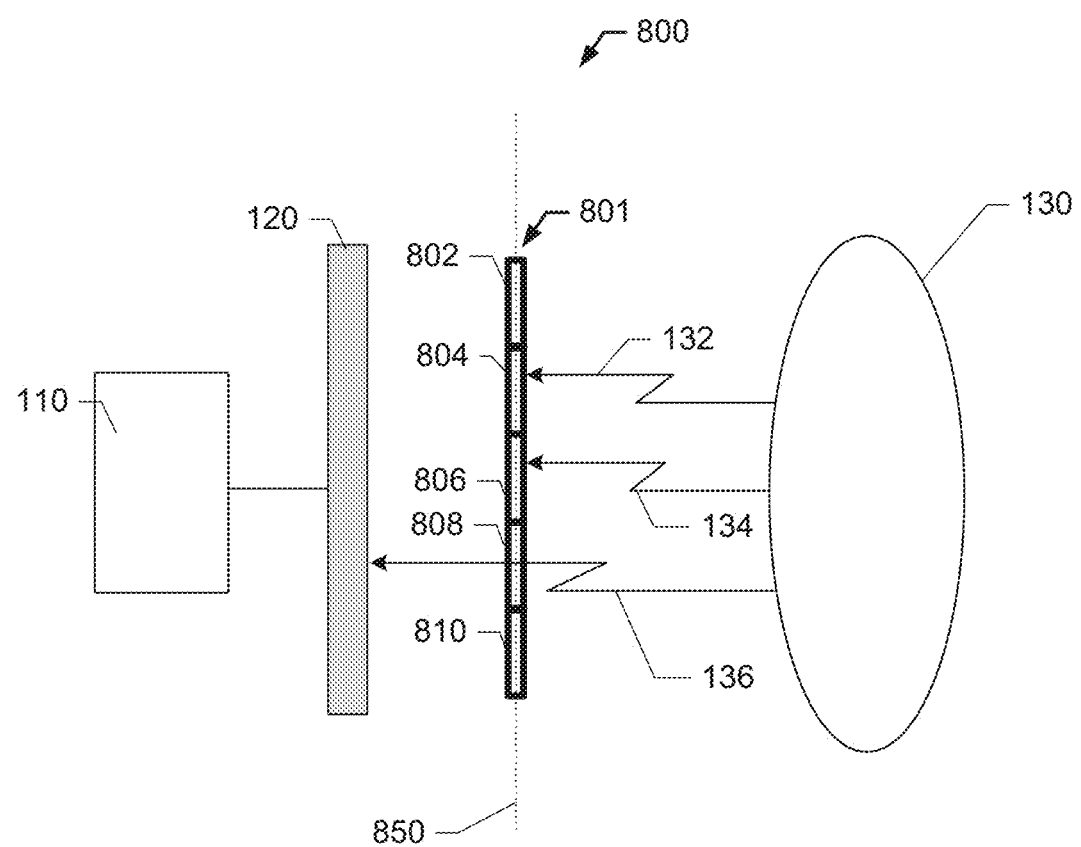
Figure 9:
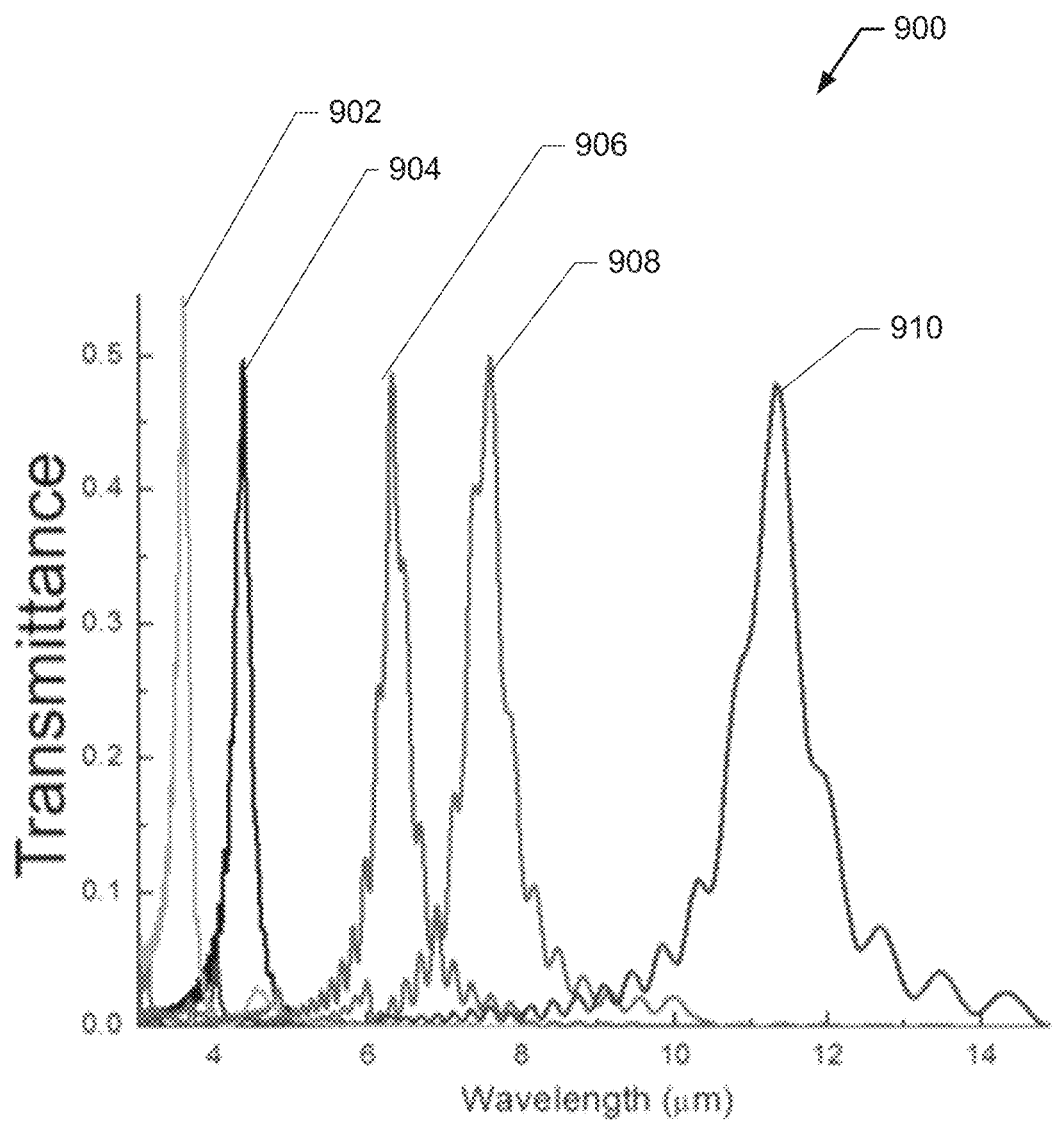
Figure 10:
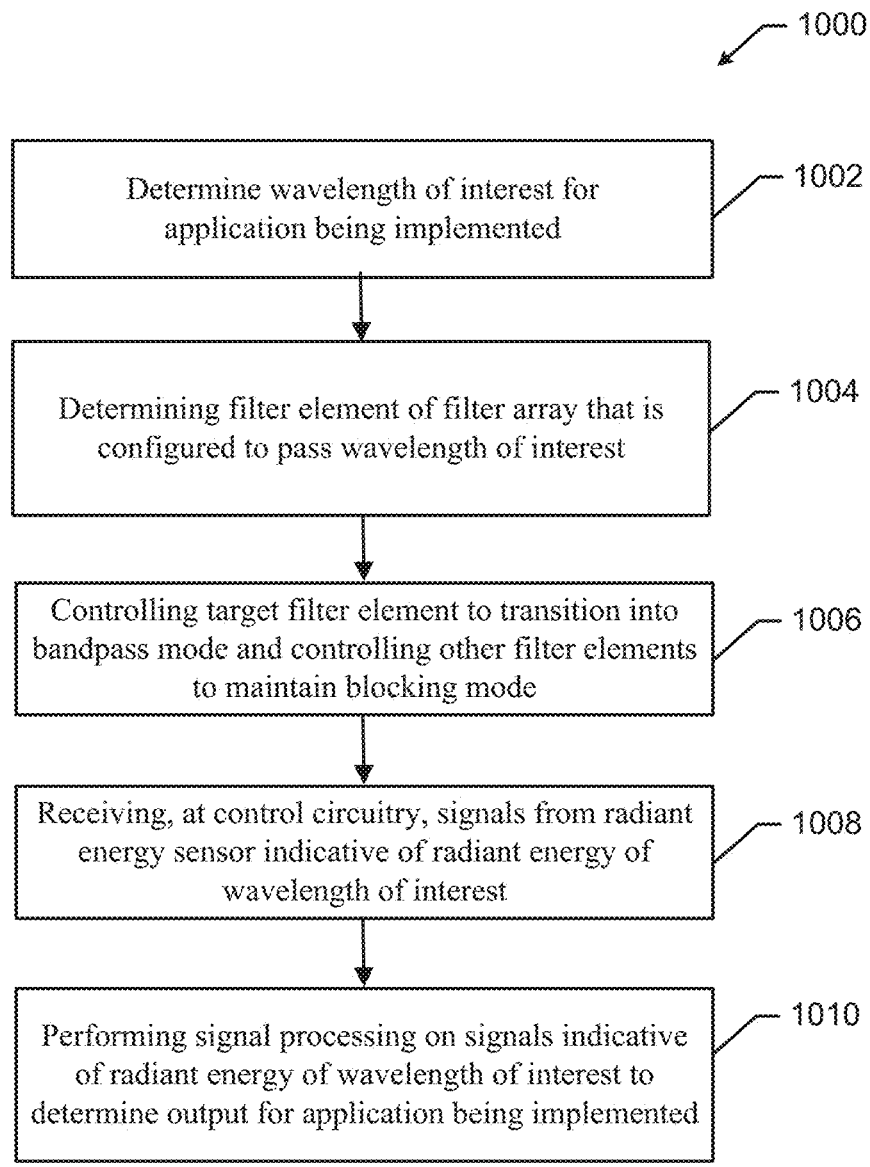

Having thus described some example embodiments in general terms, reference will now be made to the accompanying drawings, which are not necessarily drawn to scale, and wherein:

FIG. 1A shows an example system for spectral sensing or imaging with a filter apparatus in a snap up position according to some example embodiments;

FIG. 1B shows an example system for spectral sensing or imaging with a filter apparatus in a snap down position according to some example embodiments;

FIG. 1C shows an example system for spectral sensing or imaging in a transmission configuration with a filter apparatus in a snap down position according to some example embodiments;

FIG. 1D shows an example system for spectral sensing or imaging in a reflective configuration with a filter apparatus in a snap down position according to some example embodiments;

FIG. 1E shows an example system for generating spectral emissions using a filter apparatus according to some example embodiments;

FIG. 2A shows an example filter apparatus in a snap up position according to some example embodiments;

FIG. 2B shows an example filter apparatus in a snap down position according to some example embodiments;

FIG. 3A shows an example unit cell with a cross-shaped pattern feature according to some example embodiments;

FIG. 3B shows an example unit cell with a cross-shaped pattern feature including lobes according to some example embodiments;

FIG. 3C shows an example unit cell with a slit-shaped pattern feature according to some example embodiments;

FIG. 4 shows top view of patterned layer of a filter apparatus according to some example embodiments;

FIG. 5 shows a chart including graphs of the transmittance of an example filter apparatus with respect to wavelength for snap up and snap down positions according to some example embodiments;

FIG. 6 shows an example method for controlling a filter apparatus according to some example embodiments;

FIG. 7 shows an example method for fabricating a filter apparatus according to some example embodiments;

FIG. 8 shows an example system for spectral sensing or imaging with a filter array according to some example embodiments;

FIG. 9 shows a chart including graphs of the transmittances for filter elements of a filter array according to some example embodiments; and FIG. 10 shows an example method for controlling a filter array according to some example embodiments.

DETAILED DESCRIPTION

Some example embodiments now will be described more fully hereinafter with reference to the accompanying drawings, in which some, but not all, example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

As used herein the term "or" is used as the logical or where any one or more of the operands being true results in the statement being true. As used herein, the phrase "based on" as used in, for example, "A is based on B" indicates that B is a factor that determines A, but B is not necessarily the only factor that determines A.

According to some example embodiments, an apparatus and other example embodiments are provided herein that may operate as a controllable spectral filter that can be leveraged for a variety of applications including spectral sensing or imaging. The example filter may include a microelectromechanical system (MEMS) that includes two layers of metasurfaces (e.g., bilayer) that controllably move via, for example, electrostatic, piezoelectric, or electromagnetic attraction relative to each other similar to switch actuation. The movement of the metasurfaces may operate to cause the filter to transition from, for example, blocking all radiant energy in a band to operating as a bandpass filter for a selected wavelength. The metasurfaces or metasurface layers may be designed for the selected wavelength (or bandwidth), such as, for example, the infrared (IR) wavelengths in the in the mid-wavelength infrared (MWIR) spectrum, i.e., wavelengths from 3 to 8 µm, or the long-wavelength infrared (LWIR) spectrum, i.e., wavelengths from 8 to 15 µm. In this regard, the two metasurface layers may be actuated into a "snap up" position—where the filter operates to block radiant energy of the selected wavelength—and a "snap down" position—where the filter operates to permit the radiant energy of the selected wavelength to pass. As such, according to some example embodiments, the filter can be operated as a dynamic band pass filter, for example, in the form of a miniaturized dynamic and reconfigurable filter that may be operable in the IR band.

The metasurface layers may be layers of patterned metal (e.g., gold, aluminum, silver, copper, molybdenum, or the like) or, according some example embodiments, patterned layers that are formed of a dielectric. The metasurface layers may have sub-wavelength thicknesses. According to some example embodiments, the patterning on each of the metasurface layers may be identical and the filter may be designed to maintain registration between the metasurface layers in respective parallel planes. The metasurface layers may be constructed based on the design of a unit cell that is repeated as an array of unit cells across the metasurface layer. The unit cell may include a pattern feature that may, according to some example embodiments, be an opening (e.g., an etched opening) in the layer that is shaped and dimensioned based on the selected wavelength. In this regard, the pattern feature may include a dimension that is the same or smaller than the selected wavelength. The metasurface layers may be aligned in the filter such that the metasurface layers are disposed on parallel planes and the arrays of patterned elements maintain alignment.

According to some example embodiments, the pattern features of the metasurface unit cells may be designed for selected wavelengths in the infrared band. More specifically, the unit cells may be designed for wavelengths in the MWIR spectrum, i.e., wavelengths from 3 to 8 µm, and the LWIR spectrum, i.e., wavelengths from 8 to 15 µm. As such, the example filter may be designed to controllably pass a selected wavelength in the MWIR or LWIR, while filtering or blocking other wavelengths, for example, in the MWIR and the LWIR. Accordingly, such a controllable filter may be useful in coordination with a radiant energy sensor to analyze select wavelengths of radiant energy without receiving, for example, radiant energy of other, undesired wavelengths. Additionally or alternatively, such a controllable filter may be useful in coordination with a radiant energy emitter to output select wavelengths of radiant energy that may be conditioned via, for example, modulation by the controllable filter.

As such, the metasurface layers of the example filter can provide a highly efficient electromagnetic response with respect to a selected wavelength through design of the unit cell based on electric and magnetic response functions. Due to the operation and configuration of the metasurface layers, high pixel density and both spectral and polarization selectivity for high resolution hyperspectral data collection can be realized. The integration of the metasurface layers with tuning functionality provided via the MEMS features and a micromechanical suspension, according to some example embodiments, allows for a variety of filtering applications that can leverage, for example, rapid (e.g., greater than 1 kHz) dimensional changes within the filter that can be precisely controlled, where these dimensional changes, as further described below, can be relatively large in comparison to the subwavelength structuring responsible for the metasurface response. Accordingly, the combination of the metasurfaces with the MEMS actuation can, according to some example embodiments, provide for a controllable filter that is tunable with respect to both bandwidth and transmission in, for example, covering both the MWIR and the LWIR, either simultaneously or independent of one another.

Further, due to the architecture of the example filter, the example filter may be leveraged in both reflective optic systems and transmissive optics systems, which greatly expand the applications that can benefit from such a filter, particularly in the context of infrared imaging systems that employ transmissive optics rather than reflective. According to some example embodiments, the example filter may realize a spectral bandwidth resolution on the order of 100-200 nanometers (nm). Due to the integration of the MEMS functionality, the example filter may also be operated in either a modulated or continuous wave mode. The architecture of the example filter can, according to some example embodiments, support a wide field of view with negligible degradation of transmittance over +/−50 degrees of view angle from center. As mentioned above, the example filter may be operatively coupled with a radiant energy sensor to construct an electro-optical sensor system with a controllable filter that is, for example, less than 1 millimeter (mm) thick, having a volume of 5 cubic centimeters (cm$^3$), a mass of less than 10-20 grams, and power demands of less than 1 watt. Further, via the controllable bandpass functionality, the example filter can reduce the amount of data that is required to be processed in many applications because radiant energy of undesired wavelengths can be filtered out prior to reaching the radiant energy sensor. Further, as described in detail below, the example filter may be included in an array of filters where each filter is designed for a selected wavelength. As such, this filter array, according to some example embodiments, can be dynamically configurable to a variety of applications because the filter array can be controlled to be a selective bandpass filter, even amongst a number of wavelengths of interest, due to the individual, controllable nature of the filter elements of the array.

Additionally, according to some example embodiments, rather than (or possibly in addition to) using the example filter in association with a radiant energy sensor, the example filter may be used in association with a radiant energy emitter (e.g. a blackbody emitter, a laser, or other optical output device) that outputs radiant energy that may be conditioned by the example filter. In this regard, the emitter may be a separate component from the example filter or, according to some example embodiments, the emitter may be formed as a layer that is directly coupled to the example filter. A system including the example filter and the emitter may operate in, for example, two different modes for communications or emissions purposes. In a passive mode, a characteristic of a resonant self-emission may be modulated, for example, without the need for any direct illumination. Such a passive solution may be utilized, for example, as a radiant beacon or for communications purposes and may be configured to modulate between a high absorption/high transmittance state and a high reflectance/low transmittance state to generate a beacon signal or encode communications information into an output signal. Alternatively, in the active mode, the emitter may illuminate a surface of the example filter, and the example filter may be controlled to modulate the radiant energy output from the emitter by modifying the light intensity, phase, direction, polarization, or combinations thereof. Again, through the modification of the radiant energy output from the emitter, the example filter may be configured to encode information into an output signal for use in communications in this active mode.

As mentioned above, due to the dynamic nature and architecture of the example filter, the filter may be employed in a multitude of applications. For example, when applied in the context of a spectral sensing and imaging system, non-destructive pharmaceutical testing using targeted spectral analysis may be performed. Further, example embodiments of the filter may be utilized in systems used for supply chain agricultural analyses. Further, the example filter may be particularly useful in the context of chemical detection (e.g., detection of spectral signatures of chemicals), particularly in remote environments, such as in outer space or on other planets. In this regard, the example filter may be particularly useful in chemical detection applications in the infrared band because many molecular materials exhibit strong absorption or emission in the infrared wavelengths, thereby facilitating the ability to ascertain chemical compositions of a material simply by imaging the material at different wavelengths. For example, chemical compounds such as $SF_6$, HCl, chlorinated hydrocarbons, organophosphates, and the like may be examples of compounds that may be useful to identify in many different applications, and the example filter may be leveraged to do so.

Further, example embodiments of the filters may be useful in the detection of explosives in both civilian and military settings. Similarly, example embodiments may be useful in tagging, tracking, and locating (TTL) applications, where, for example, a substance with a certain spectral signature is applied to an object for tracking purposes. Such TTL applications often utilize taggant chemicals and substances that have spectral signatures in the infrared spectrum. Additionally, example embodiments may be useful in the context of long-range spectral imaging, such as, for example, from an aerial position coupled to an aircraft, such as an aerial drone.

As part of a radiant energy emission system (e.g., emitter system), example embodiments may be used to form or generate communications signals via, for example, modulation performed by an example filter. Further, an example filter, according to some example embodiments, may be used in associated with an emitter to construct a radiant energy beacon to support locating and tracking of objects such as, for example, mobile objects to which the radiant energy beacon is affixed. Additionally, an emitter system, according to some example embodiments, may be utilized to generate an output signal for use in calibrating optical equipment or the like. In this regard, example embodiments may be configured to generate and output signals having designed spectral signatures that may be detected by other optical equipment and used for simulation and calibration.

Accordingly, as further described in detail below, apparatuses, systems, and methods are provided that integrate metasurfaces with MEMS technologies to realize a dynamic filter with selective bandpass capabilities, for example, in the IR spectrum. In this regard, FIGS. 1A and 1B illustrate, according to some example embodiments, an example system 100 configured for spectral sensing or imaging that includes an example filter apparatus 101. The system 100 may include the filter apparatus 101, a radiant energy sensor 120, and control circuitry 110. According to some example embodiments, the system 100 may further include various passive or active optical elements including lenses, mirrors, beam splitters, polarizers, frequency shifters, or the like that would be familiar to one of skill in the art within this context.

According to some example embodiments, the filter apparatus 101 may be disposed in a radiant energy path between a source 130 and the radiant energy sensor 120. The control circuitry 110 may be in communication with the radiant energy sensor 120 and the filter apparatus 101 to control the operation of the system 100 and perform analyses on sensor image data provided by the radiant energy sensor 120 to the control circuitry 110. Further, according to some example embodiments, the filter apparatus 101 may be disposed in a radiant energy path of an emitter 121 (shown in FIG. 1E and further described below) and may be configured to condition the radiant energy provided by the emitter 121.

The source 130 may be any type of radiant energy source or object that radiant energy is passed through or reflected off. In this regard, as mentioned above, the source 130 may be, for example, an unknown chemical that the system 100 is analyzing using a spectral analysis. Regardless of the initial source of radiant energy, some radiant energy of different wavelengths (e.g., wavelength 132, wavelength 134, wavelength 136, etc.) may be provided by the source 130 to the system 100.

Further, the source 130 may be, itself, a source of radiant energy (e.g., a star or other light source). However, when the source 130 is an object that radiant energy is either passed through or reflected off, the system may be configured differently to provide the source radiant energy to the object to pass through the object in a transmission configuration or reflect off of the object in a reflective configuration. In this regard, FIG. 1C shows and example system 103 that is in a transmission configuration where source emitter 150 generates source radiant energy 151 directed towards the radiant energy sensor 120, which is passed through, in this case object 130 (e.g., a chemical), to form radiant energies of different wavelengths (e.g., wavelength 132, wavelength 134, and wavelength 136) due to the interaction with the object 130. Alternatively, with respect to FIG. 1D, an example system 105 that is provided that is in a reflective configuration. In the system 105, the source emitter 150 may generate source radiant energy 151 directed towards, for example, a polarizing mirror 155 and is reflected off of the polarizing mirror 155 to form source radiant energy 152. Source radiant energy 152 is then reflected off of the source (object) 130 (e.g., a chemical). The radiant energy reflected off of the object 130 may have differing wavelengths (e.g., wavelength 132, wavelength 134, and wavelength 136) due to the interaction with the object 130 and may pass through the polarizing mirror 155 towards the radiant energy sensor 120. With the exception of how the source radiant energy is provided to or by the source 130, the systems 103 and 105 are configured and operate similarly as the radiant energy of differing wavelengths reaches the filter apparatus 101, as described below with respect to the system 100 of FIGS. 1A and 1B.

In this regard, the filter apparatus 101 may include a beam portion 104 and a base portion 102. The beam portion 104, as further described below, may include a patterned metal layer that embodies one of the metasurface layers. Another patterned metal layer may be included in the base portion 102. The control circuitry 110 may be in communication with the beam portion 104 and the base portion 102 to apply an electric voltage or waveform to one or both of the beam portion 104 and the base portion 102 to generate or remove an attractive force (e.g., an electrostatic force, a piezoelectric force, an electromagnetic force, or the like) between the patterned metal layers of the beam portion 104 and the base portion 102 to cause relative movement due to the force. In this regard, the beam portion 104, according to some example embodiments, may be supported, with a first patterned metal layer, above the base portion 102, which may include a second patterned layer. As further described herein, the beam portion 104 may be a micromechanical suspension (described in further detail below with respect to beam portion 220 shown in FIGS. 2A and 2B), where a gap 106, e.g., a separation distance between the beam portion 104 and the base portion 102, is controllable by an electrical waveform provided, for example, by control circuitry 110. According to some example embodiments, the filter apparatus 101 may include actuation and anchor member that couples the beam portion 104 to the base portion 102 and is configured to maintain the filter apparatus 101, including the beam portion 104 and the base portion 102, as a unit, but provides for relative movement between the beam portion 104 and the base portion 102 such that the gap 106 therebetween can be reduced or fully closed. Additionally, via, for example, an actuation and anchor member (e.g., actuation and anchor member 216 shown in FIGS. 2A and 2B), a mechanical bias may be present in the filter apparatus 101 that urges the beam portion 104 and the base portion 102 apart and into the snap up position. As such, when no voltage or no voltage potential difference (e.g., no electric waveform) is applied to the beam portion 104 and the base portion 102, according to some example embodiments, the beam portion 104 and the base portion 102 may rest in the snap up position where the gap 106 is, for example, at a maximum distance or width. As such, the control circuitry 110, which may be configured to control the application of a voltage or an electric waveform between the patterned layers of the beam portion 104 and base portion 102, may operate to control the movement of the patterned layer of the beam portion 104 and the patterned layer of the base portion 102 into different positions (e.g., the snap up position, the snap down position, or in positions therebetween) such that a gap distance between the beam portion 104 and the base portion 102 or the gap distance between the patterned layers can be changed. At different gap distances, the filter apparatus 101 may be configured to realize different transmittances for radiant energy of a selected wavelength passing through the filter apparatus 101 to change, for example, from a first transmittance value to a second transmittance value.

Accordingly, as shown in FIG. 1A, the filter apparatus 101 is in the snap up position due to existence of the gap 106 because no voltage difference (e.g., zero volts) is being applied to the beam portion 104 and the base portion 102. As further described herein, when the filter apparatus 101 is in the snap up position, the filter apparatus 101 operates to block radiant energy of the selected wavelength, as well as other radiant energy of other wavelengths, for example, within the IR band. In this regard, the filter apparatus 101, when in the snap up position, may have a near zero transmission response at the selected frequency, as well as across the band of interest, which may include the IR band or, more specifically, the MWIR and LWIR bands. In the example scenario shown in FIG. 1A, the radiant energy of wavelengths 132, 134, and 136 is being blocked or filtered by the filter apparatus 101 due to the gap 106 and, therefore, radiant energy of wavelengths 132, 134, and 136 does not pass through the filter apparatus 101 to the radiant energy sensor 120.

Now referring to FIG. 1B, the control circuitry 110 may be configured to provide a voltage to the beam portion 104 and/or the base portion 102 sufficient to form an attractive force (e.g., an electrostatic force, a piezoelectric force, an electromagnetic force, or the like) between the patterned metal layers of the beam portion 104 and the base portion 102 to cause relative movement and close the gap 106. As shown in FIG. 1B, the gap 106 has been closed with the filter apparatus 101 being in the snap down position. Due to this configuration, the filter apparatus 101 may transition to change the transmittance to, for example, become a band-pass filter with an increased transmittance at the selected wavelength for the filter apparatus 101. As shown in FIG. 1B, the radiant energy from the source 130 at wavelength 132 and 136 is still blocked, but the radiant energy at wavelength 134 (or a portion thereof) may now pass through the filter apparatus 101 to the radiant energy sensor 120 to be received. Upon receipt, the radiant energy sensor 120 may convert the radiant energy into a signal for provision to the control circuitry 110 for, for example, spectral analysis.

As such, the control circuitry 110 may be configured to control the distance (e.g., width) of the gap 106 between the beam portion 104 and the base portion 102, and more specifically the distance between the metasurface patterned payers of the beam portion 104 and the base portion 102. The control circuitry 110 may therefore be configured to cause the movement of the beam portion 104 relative to base portion 102 either increase or decrease the distance of the gap 106 through application of a voltage to the metasurface patterned layers. As such, by reducing the distance of the gap 106 from a first gap distance corresponding to the first transmittance value to a second gap distance corresponding to the second transmittance value (e.g., moving from the snap up position to the snap down position), a transmittance of the filter apparatus 101 may be increased from the first transmittance value to the second transmittance value (i.e., the first transmittance value is less than the second transmittance value). Similarly, by increasing the distance of the gap 106 from a first gap distance corresponding to the first transmittance value to a second gap distance corresponding to the second transmittance value (e.g., moving from the snap down position to the snap up position), a transmittance of the filter apparatus 101 may be decreased from the first transmittance value to the second transmittance value (i.e., the first transmittance value is greater than the second transmittance value). Additionally, the control circuitry 110 may be configured to repeatedly change the distance of the gap 106, for example, between the snap up position and the snap down position to change between transmittances (e.g., between the first transmittance and the second transmittance) to, for example, modulate the radiant energy at the selected wavelength that is passing through the filter apparatus 101.

The radiant energy sensor 120 may be any type of spectral sensor or spectrometer module that is capable of receiving radiant energy (e.g., light), converting the receipt of the radiant energy into an electrical signal (e.g., via an analog-to-digital converter), and communicating the electrical signal to a signal processor (e.g., the control circuitry 110) for analysis. The radiant energy sensor 120 may, according to some example embodiments, be configured to operate in a selected broad or narrow wavelength band, such as, in the infrared frequency band. The radiant energy sensor 120 may include, for example, a diode array. Further, the radiant energy sensor 120 may be embodied as a charge-coupled device (CCD) or a complementary metal-oxide semiconductor (CMOS) image sensor.

The control circuitry 110 may be an assembly of circuitry including processing circuitry with one or more processors (or processor cores) and memory. The control circuitry 110 may also include programmable input/output peripherals, such as a user interface and a communications interface. The control circuitry 110 may be in operative communication with the filter apparatus 101 and the radiant energy sensor 120, for example, via the communications interface. The control circuitry 110 may be configurable to perform various operations as described herein including operations associated with controlling the operation of the system 100 and spectral analysis and processing. In this regard, the control circuitry 110 may be configured to perform computational processing and memory management according to some example embodiments to facilitate performing various functionalities described herein. In some embodiments, the control circuitry 110 may include or be embodied as a chip or chip set. In other words, the control circuitry 110 may include one or more physical packages (e.g., chips) including materials, components, or wires on a structural assembly (e.g., a baseboard). The control circuitry 110 may be embodied as a circuit chip [e.g., an integrated circuit chip, such as an application-specific integrated circuit (ASIC) or a field programmable gate array (FPGA)] configured (e.g., with hardware, software or a combination of hardware and software) to perform operations described herein. The control circuitry 110 may be configured to receive inputs, for example, from the communications interface, the user interface, and/or the radiant energy sensor 120 and perform actions based on the inputs, and generate outputs. Further, in some example embodiments, the control circuitry 110 may be a configuration of components including some analog components, such as, analog band-pass filters. Further, operational amplifiers and other passive components, such as resistors and capacitors, may also be included to support the operation and functionalities performed by the control circuitry 110 as described herein. As such, the control circuitry 110 may be configured to perform signal conditioning and processing using either analog or digital techniques.

In some example embodiments, the memory of the control circuitry 110 may include one or more non-transitory memory devices such as, for example, volatile or non-volatile memory that may be either fixed or removable. The memory may be configured to store information, data, applications, instructions, or the like for enabling, for example, execution of procedures and the like to carry out various functions in accordance with example embodiments. For example, the memory could be configured to buffer input data for processing by, for example, the processing circuitry of the control circuitry 110. Additionally or alternatively, the memory could be configured to store instructions for execution by the control circuitry 110. Among the contents of the memory, applications may be stored for execution by the control circuitry 110 in order to carry out the functionality associated with each respective application.

According to some example embodiments, the control circuitry 110 may be configured to execute instructions stored in the memory or otherwise accessible to the control circuitry 110. As such, whether configured by hardware or by a combination of hardware and software, the control circuitry 110 may represent an entity (e.g., physically embodied in circuitry—in the form of processing circuitry) capable of performing operations according to example embodiments while configured accordingly. Thus, for example, when the control circuitry 110 is embodied by or includes an ASIC, FPGA, or the like, the control circuitry 110 may be specifically configured hardware for conducting the operations described herein. Alternatively, as another example, when the control circuitry 110 is embodied as an executor of software instructions, the instructions may specifically configure the control circuitry 110 to perform the operations described herein.

The communications interface of the control circuitry 110 may include one or more interface mechanisms for enabling communication with other devices internal and external to the system 100. For example, with respect to external devices, the communications interface may be configured to communicate via a connection (wired or wireless) to a network, such as a local area network. In some cases, the communication interface may be any means such as a device or circuitry embodied in either hardware, or a combination of hardware and software that is configured to receive or transmit data from/to devices in communication with the control circuitry 110. The communications interface may be a wired or wireless interface and may support various communications protocols. Communications interface may be operably coupled to an antenna to support wireless communications to other components. In this regard, the communications interface and the antenna may support communications via, for example, wireless (e.g., BLUETOOTH® or WIFI®) connections. According to some example embodiments, the communications interface may include components and configurations to support communications via universal serial bus (USB) connection. The communications interface may be configured to provide a communication mechanism for external systems (such as a laptop) to the control circuitry 110, for example, to enable viewing of the measurement information and/or programming of the control circuitry 110.

The user interface of the control circuitry 110 may be controlled by the control circuitry 110 to facilitate interaction with a user. In this regard, via the user interface, the control circuitry 110 may be configured to output information to a user via an output device such as, for example, driving a display [e.g., in the form of a collection of indicator lights or light emitting diodes (LEDs)] or an audio device (e.g., a speaker) and receive information input from a user via an input device such as, for example, a keyboard, mouse, touch screen, or the like. According to some example embodiments, the user interface may include status LEDs to provide status information to a user. In this regard, the status LEDs can provide a visual indication of the operations of the system 100, such as power on, power off, measuring, charging, or the like.

With reference to FIG. 1E, the filter apparatus 101 may also be used, according to some example embodiments, in association with an emitter 121 as shown in the system 107. The system 107 may include the control circuitry 110, the filter apparatus 101, and an emitter 121. The emitter 121 may be a blackbody emitter, a laser, or other optical device configured to output radiant energy that is controllable, for example, by the control circuitry 110. In this regard, the control circuitry 110 may be configured to control the emitter 121 to output radiant energy 138 to the filter apparatus 101, which the filter apparatus 101 may act upon to, for example, form an output signal 140. The emitter 121 may be configured to output radiant energy 138 at the selected wavelength for the filter apparatus 101. In the example embodiment shown in FIG. 1E, the emitter 121 is shown as a separate device from the filter apparatus 101. However, according to some example embodiments, the emitter 121 may be affixed to or integrated with the filter apparatus 101 as a layer (e.g., deposited or thin film layer) of a formed stack of the filter apparatus 101. In this regard, the layer of the emitter 121 may be, for example, disposed on the external surface of the beam portion 104 or the base portion 102.

The control circuitry 110 may be configured to control the filter apparatus 101, as described above, to selectively pass the radiant energy 138 through the filter apparatus 101 to form an output signal 140. The control circuitry 110 may control the filter apparatus 101 to, for example, inhibit transmission of the radiant energy 138 at the selected frequency (e.g., in the snap up position) or permit transmission of the radiant energy 138 at the selected frequency (e.g., in the snap down position as shown in FIG. 1C) through the filter apparatus 101 to form the output signal 140. In this regard, the control circuitry 110 may control the filter apparatus 101 to operate, for example, in a passive mode, where a characteristic of the radiant energy 138 may be modulated, for example, without the need for any direct illumination. In such a passive mode, the control circuitry 110 may cause the filter apparatus 101 to modulate between a high absorption/high transmittance state (e.g., snap down) and a high reflectance/low transmittance state (e.g., snap up) to, for example, encode communications information into the output signal 140. In an active mode, the control circuitry 110 may control the filter apparatus 101 to modulate the radiant energy 138 output from the emitter 121 at the selected wavelength. In this regard, depending on construction and operation of the filter apparatus 101 by the control circuitry 110, the intensity, phase, direction, polarization, or the like, of the radiant energy 138 at the selected wavelength may be modulated or otherwise modified by the filter apparatus 101. Through modification of the radiant energy 138 output from the emitter 121, the filter apparatus 101 may be controlled to, for example, encode information into the output signal 140 for use in communications.

According to some example embodiments where the emitter 121 is, for example, a blackbody emitter, the control circuitry 110 may operate as a stimulus device to control a temperature of the emitter 121. By controlling the temperature of the emitter 121, spectral, spatial, temporal, and polarization control of the emissions of the emitter 121 may be controlled. As such, via control of the emitter 121 and control of filter characteristics of the filter apparatus 101, as described above, information may be encoded into the output signal 140. In this regard, spectral control may be performed through modifications of the wavelength behavior of the radiant energy 138 at select bands. For example, the filter apparatus 101 may be operated to effectuate changes in the amplitude of reflection/transmission/absorption of the radiant energy 138, which may result from a shift in a wavelength or via amplitude modulation. Further, the filter apparatus 101 may be controlled to support spatial modulation through, for example, control by pixilation or another similar scheme to locally modify spectral properties across the filter apparatus 101, and more particularly, the metasurfaces of the filter apparatus 101. Additionally, the filter apparatus 101 may perform temporal control of the radiant energy 138, which may relate to a modulation bandwidth of the output signal 140 and an ability to dynamically modulate or reconfigure the metasurfaces of the filter apparatus 101, for example, as a function of time. Also, polarization control may be performed by the filter apparatus 101 through select modulation at distinct polarization states (e.g., linear or circular), which may also operate to generate polarization changes such as between a mirror surface and a quarter- or half-waveplate.

Having provided a general discussion of the filter apparatus 101 and a context in which the filter apparatus 101 may be operated, FIG. 2A through FIG. 4 provide additional description of the structure and configuration of an example filter apparatus 200, which may operate in the same or similar way as the filter apparatus 101 described above. In this regard, FIG. 2A shows an example filter apparatus 200 in the snap up position. The filter apparatus 200 includes, according to some example embodiments, a bilayer metasurface structure configured to operate as a MEMS using a micromechanical suspension to facilitate filter control.

Similar to the filter apparatus 101, the filter apparatus 200 may include a beam portion 220 and a base portion 230. The base portion 230 may include a first patterned layer 204 and a substrate 202, wherein the first patterned layer 204 may be coupled to the substrate 202. The beam portion 220, which may be a movable portion and may be (or include) a micromechanical suspension, may include an upper beam layer 210, a second patterned layer 208, and a spacer 206. According to some example embodiments, the second patterned layer 208 may be coupled to the spacer 206, and the upper beam layer 210 may be coupled to the second patterned layer 208. Further, the upper beam layer 210 may be coupled to a first surface of the second patterned layer 208 (i.e., the top/upper surface of the second patterned layer 208 as viewed in FIGS. 2A and 2B), and the spacer 206 may be coupled to a second surface of the second patterned layer 208 (the bottom/lower surface of the second patterned layer 208 as viewed in FIGS. 2A and 2B), where the second surface of the second patterned layer 208 is opposite the first surface of the second patterned layer 208.

The upper beam layer 210 may be formed of, for example, a dielectric material that has a high transparency to radiant energy at the selected wavelength for the filter apparatus 200. As such, for example, the upper beam layer 210 may be formed of silicon and may be unpatterned. More specifically, the upper beam layer 210, may be formed of amorphous polycrystalline silicon (a-Si). The upper beam layer 210 may operate to provide a protective layer to the second patterned layer 208 and may also provide rigidity to the beam portion 220 to assist in maintaining registration between the second patterned layer 208 and the first patterned layer 204 and avoid curvature of the beam portion 220. According to some example embodiments, the upper beam layer 210 may have a thickness (or height, as viewed in FIGS. 2A and 2B), of about 150 nm for some applications.

The second patterned layer 208 may be (or include) one of two metasurface layers (a first metasurface layer and a second metasurface layer) within the filter apparatus 200. In this regard, the second patterned layer 208 may be a second metasurface layer 208 formed of a metal that is, for example, highly conductive and highly transparent to radiant energy of the selected wavelength. For example, gold may be used to form the second patterned layer 208/second metasurface layer 208. Alternatively, according to some example embodiments, the second patterned layer 208 may be formed of a dielectric. As a metasurface, the second patterned layer 208 may have a thickness (or height) that is less than the selected wavelength for the filter apparatus 200. For example, according to some example embodiments, the thickness of the second patterned layer 208 may be 60 nm. Additionally, the second patterned layer 208 may include an array of unit cells that include respective pattern features that may be formed as openings (e.g., slits or the like) spaced across and through the surface of the second patterned layer 208. According to some example embodiments, the unit cell and associated pattern features may form a first pattern for the first patterned layer.

FIG. 3A shows an example unit cell 300 that may be one component of an array of unit cells that may be included on the second patterned layer 208. In this regard, the unit cell 300 may include a metal portion 302, which may be, for example, shaped as a square and part of a larger sheet of the second patterned layer 208. The example unit cell 300 may also include a pattern feature 304, which may be a portion of the unit cell 300 where an opening has been formed by, for example, etching a portion of the metal portion 302 away. The pattern feature 304 may be designed for operation with respect to the selected wavelength of the filter apparatus 200. In this regard, the dimensions of the pattern feature 304 may be selected or determined such that the metasurface formed by the second patterned layer 208 operates to pass radiant energy of the selected wavelength, when the filter apparatus 200 is configured to do so. As such, by modifying the metasurface geometry via modification of the pattern feature 304, the wavelength for the filter apparatus 200 may be selected as any arbitrary wavelength and the unit cell 300 may be designed accordingly. Additionally, the pattern feature 304 may be designed and configured to filter radiant energy with respect to polarization. In this regard, linear and circular polarizations of radiant energy may be filtered. In this regard, according to some example embodiments, a pattern feature may be designed and configured to filter radiant energy having a selected linear or circular polarization.

The example unit cell 300 includes a pattern feature 304 that is shaped as a cross pattern feature. In this regard, the cross may be shaped as two perpendicular slits in the metal portion 302. According to some example embodiments, perpendicular slits may be used, as opposed to single slit, to permit passage of the selected wavelength at different polarizations. The pattern feature 304 as a cross pattern feature may include dimensions. At least one dimension of the pattern feature 304 may be the same or less than the selected wavelength. Due to the symmetry of the unit cell 300 and the pattern feature 304 of a cross, the dimensions may include a unit cell length 308, a pattern feature height 306 (in this case, a cross height 306), and pattern feature thickness 310 (in this case, a cross thickness 310). According to some example embodiments, the cross height 306 may be a dimension that is the same or less than the selected wavelength. The unit cell length 308 may be a dimension that is associated with any type of pattern feature 304 and may indicate a degree of spacing between the pattern features in the array of the second patterned layer 208.

In this regard, for example, for a selected wavelength for unit cell 300 of 10.6 µm, the unit cell length 308 may be 2.4 µm, the cross height 306 may be 1.8 µm, and the cross thickness 310 may be 250 nm. For an example unit cell 300 with a selected wavelength of 4.4 µm, the unit cell length 308 may be 1 µm, the cross height 306 may be 0.65 µm, and the cross thickness 310 may be 200 nm. For an example unit cell 300 with a selected wavelength of 6.1 µm, the unit cell length 308 may be 1.4 µm, the cross height 306 may be 1.0 µm, and the cross thickness 310 may be 200 nm. For an example unit cell 300 with a selected wavelength of 7.3 µm, the unit cell length 308 may be 1.8 µm, the cross height 306 may be 1.2 µm, and the cross thickness 310 may be 250 nm. For an example unit cell 300 with a selected wavelength of 12.3 µm, the unit cell length 308 may be 2.8 µm, the cross height 306 may be 2.15 µm, and the cross thickness 310 may be 300 nm. As such, for example, for wavelengths in the IR band, the cross height may range from about 0.5 µm to 2.2 µm.

The cross shape of the pattern feature 304 may be just one example of the pattern feature that may be used in a unit cell of the filter apparatus 200, according to some example embodiments. Other examples of shapes of pattern features that may alternatively be used in an array of unit cells across the second patterned layer 208 are provided in FIGS. 3B and 3C. In this regard, a unit cell 350 shown in FIG. 3B has a pattern feature 352 with a more complex cross shape with lobes at the ends of the arms of the cross disposed in the metal portion 302. The pattern feature 352 is symmetric and therefore may have similar polarization characteristics as the pattern feature 304. Alternatively, as shown in FIG. 3C, a unit cell 375 may have a pattern feature 376 that is a vertical slit. In this regard, since pattern feature 376 is not symmetric, the polarization effect of pattern feature 376 may be different than pattern feature 304 and pattern feature 352. Additionally, according to some example embodiments, the dimensions of the pattern features may also be designed or determined for the selected wavelength (and polarization) of the filter apparatus 200.

As mentioned above, the unit cells may be repeated to form an array across the surface of the second patterned layer 208. FIG. 4 shows a top view of an example portion of a first patterned layer 400 (which may be the same or similar to the second patterned layer 208). The first patterned layer 400 may be shaped, for example, as a square with length and width dimensions of, for example, 100 µm by 100 µm. As can be seen, the unit cell and the pattern features may be evenly spaced across the surface of the first patterned layer 400 in an array.

Referring back to FIG. 2A, the second patterned layer 208 may be disposed on the spacer 206, and as such may be sandwiched between upper beam layer 210 and the spacer 206 to form the beam portion 220. The spacer 206 may be formed of, for example, a dielectric material that has a high transparency to radiant energy at the selected wavelength for the filter apparatus 200. As such, for example, the spacer 206 may be formed of silicon, and may be unpatterned. More specifically, the spacer 206, may be formed of amorphous polycrystalline silicon (a-Si). The spacer 206 may also operate to provide rigidity to the beam portion 220 to assist in maintaining registration between the second patterned layer 208 and the first patterned layer 204 and avoid curvature of the beam portion 220. According to some example embodiments, the spacer 206 may have a thickness or height of about 150 nm for some applications. According to some example embodiments, the spacer 206 may be designed to provide a selected length of spacing between the second patterned layer 208 and the first patterned layer 204, when the filter apparatus 200 is in the snap down position.

Because the filter apparatus 200 is shown in the snap up position in FIG. 2A, a gap 212 (e.g., air gap) is present between the spacer 206 and the first patterned layer 204. The gap 212 may have a gap distance 214. The gap distance 214 may be selected and designed such that the gap distance 214, when the filter apparatus 200 is in the snap up position, causes a change in the transmittance, such as, for example, a reduction (e.g., to a low value such as zero) in the transmittance of radiant energy at the selected wavelength. The gap distance 214, as shown in FIGS. 2A and 2B, is defined between the lower surface of the spacer 206 and the upper surface of the first patterned layer 204. However, according to some example embodiments, the gap distance may be the distance between the lower surface of the second patterned layer 208 and the upper surface of the first patterned layer 204, for example, in embodiments where no spacer 206 is included. The reduction in transmittance may be such that, according to some example embodiments, very little or no radiant energy at the selected wavelength passes through the filter apparatus 200 when the filter apparatus 200 is in the snap up position and gap distance 214 is at, for example, a maximum value due to the filter apparatus 200 being in the snap up position. For example, the gap distance 214 when the filter apparatus 200 is in the snap up position, may be 1 µm. According to some example embodiments, the gap distance 214 may be at least a minimum distance to provide for the desired blocking functionality as described herein, for example, the minimum distance may be 1 µm.

As mentioned above, the base portion 230 may include the first patterned layer 204 and the substrate 202. The first patterned layer 204 may be disposed on the substrate 202. According to some example embodiments, the first patterned layer 204 may be (or include) the first metasurface layer described above, and may be designed and constructed to be identical (or substantially identical) to the second patterned layer 208. In this regard, the first patterned layer 204/first metasurface layer 204 may include unit cells and pattern features disposed in an array in the same manner as described with respect to the second patterned layer 208 and FIG. 3A through FIG. 4. Alternatively, the first patterned layer 204 may include unit cells and pattern features disposed in an array, where the pattern features of the unit cells of the first patterned layer 204 are different in, for example, shape or dimensions, from the pattern features of the unit cells of the first patterned layer 204. As such, with the exception of the placement of the first patterned layer 204 on the substrate 202, according to some example embodiments, the second patterned layer 208 and the first patterned layer 204 may be identical. According to some example embodiments, the second patterned layer 208 and the first patterned layer 204 may have identical complementary pattern features (e.g., cross pattern features). Further, the second patterned layer 208 and the first patterned layer 204 may be disposed in parallel planes, and may remain in parallel planes, and in registration or alignment, when the filter apparatus 200 is operated between the snap up and snap down positions as described herein. In this regard, the first patterned layer 204 may include unit cells and associated pattern features to form a second pattern for the second patterned layer, where the second pattern matches (e.g., is the same as) the first pattern of the first patterned layer.

The first patterned layer 204 may be disposed on the substrate 202. In this regard, the substrate 202 may be formed of a dielectric material that has a high transparency and can provide a base for fabrication of the filter apparatus 200, which may involve etching, lithography, or other fabrication processes as further described below. The substrate may have greater than a substrate threshold transmittance (e.g., 90%) at the selected wavelength. According to some example embodiments, the substrate 202 may operate as a ground plane for the filter apparatus 200. According to some example embodiments, the substrate 202 may have a thickness of, for example, 500 µm. The substrate 202 may also have any anti-reflective coating. In this regard, the anti-reflective coating may have a coating threshold transmittance (e.g., 90%) at the selected wavelength. As such, according to some example embodiments, the substrate 202 may be formed as or include a double-sided anti-reflective (AR) coated undoped germanium wafer (e.g., due to germanium's high refractive index), which may allow high transparency/transmission of wavelengths in the IR band including the MWIR and LWIR bands. The substrate 202 may, according to some example embodiments, have a 95% transmittance in the IR band and more specifically in the MWIR and LWIR bands. Alternatively, according to some example embodiments, the substrate 202 may include other materials, such as, for example, silicon, zinc selenide (ZnSe), or the like.

To physically couple the beam portion 220 to the base portion 230, the filter apparatus 200 may also include an actuation and anchor member 216. The actuation and anchor member 216 may physically connect the beam portion 220 to the base portion 230 to facilitate controlled movement of, for example, the beam portion 220 such that the second patterned layer 208 maintains registration with the first patterned layer 204 during actuation of the MEMS functionality and the micromechanical suspension of (or implemented by/as) the beam portion 220. The actuation and anchor member 216 may be disposed such that the actuation and anchor member 216 creates a mechanical bias that is applied between the beam portion 220 and the base portion 230 to urge the filter apparatus 200 into the snap up position. The mechanical bias may operate to cause the gap distance 214 to be at a maximum when, for example, no voltage is applied to the second patterned layer 208 and the first patterned layer 204. However, a magnitude of the mechanical bias may be designed to be sufficiently low that an attraction force (e.g., an electrostatic force, a piezoelectric force, an electromagnetic force, or the like) formed by applying a voltage potential between the second patterned layer 208 and the first patterned layer 204 may overcome the mechanical bias to move, for example, the beam portion 220 into the snap down position.

As shown in FIG. 2A, the beam portion 220 may be suspended over the base portion 230 by the actuation and anchor member 216. The actuation and anchor member 216 may be formed of a flexible material that retains a form to allow for actuation of beam portion 220 towards the base portion 230 when an attraction force 209 is applied as further described below, but also provide a mechanical bias to urge the beam portion 220 back into the snap up position. According to some example embodiments, the actuation and anchor member 216 may be formed of, for example, a metal such as aluminum. Although not shown in FIGS. 2A and 2B, a portion of the actuation and anchor member 216 that is in physical contact with the beam portion 220 may extend around a perimeter of the beam portion 220 leaving a central area open to permit the passage of radiant energy through the filter apparatus 200. According to some example embodiments, the actuation and anchor member 216 may be transparent or substantially transparent (particularly at the selected wavelength) in an example embodiment where the actuation and anchor member 216 covers the beam portion 220 (e.g., with no central open area). Further, the actuation and anchor member 216 may be disposed, for example, on the substrate 202 and extend upwards and be affixed to the beam portion 220.

With respect to operation, the filter apparatus 200 may operate in the same or similar manner as the filter apparatus 101 of FIGS. 1A and 1B. In this regard, the second patterned layer 208 and the first patterned layer 204 may be electrically connected to control circuitry (e.g., control circuitry 110) to selectively apply a voltage potential between the second patterned layer 208 and the first patterned layer 204. When no voltage is applied, the filter apparatus 200 may be in a snap up position with gap distance 214 of the gap 212 at, for example, a maximum distance. In this regard, the actuation and anchor member 216 may hold the beam portion 220 in the snap up position when no voltage is applied. In this snap up position, the second patterned layer 208 and the first patterned layer 204 may be displaced apart and the resonant transmission peaks of each of the second patterned layer 208 and the first patterned layer 204 may be separated in wavelength because, in the snap up position. The separation in wavelength of the resonant transmission peaks may occur because the second patterned layer 208, according to some example embodiments, is capped by the upper beam layer 210 (e.g., a silicon layer) and the first patterned layer 204 is capped by, for example, air (e.g., the gap 212) in the snap up position.

When the control circuitry 110 applies a voltage and creates a voltage potential difference between the second patterned layer 208 and the first patterned layer 204, an attraction force 209 (shown in FIG. 2A) may be generated that urges the second patterned layer 208 and the first patterned layer 204 together. The attraction force 209 may be, for example, an electrostatic, piezoelectric, or electromagnetic force. As such, when a sufficient voltage is applied, the second patterned layer 208 and the beam portion 220 may be attracted to the first patterned layer 204 and the base portion 230 until a mechanical bias of the actuation and anchor member 216 is overcome causing the beam portion 220 to move towards the base portion 230, thereby placing the filter apparatus 200 in the snap down position. The movement may continue until the spacer 206 physically contacts the first patterned layer 204. In this regard, the magnitude of the attractive force may be a function of the applied voltage. As such, at high voltages, the physical engagement between the spacer 206 and the first patterned layer 204 may increase as the attractive force is distributed across a plurality of engagement points.

Now referring to FIG. 2B, the filter apparatus 200 is shown in the snap down position with the actuation and anchor member 216 flexed downward. Due to the construction of the actuation and anchor member 216, a mechanical bias provided by the actuation and anchor member 216 that urges the beam portion 220 upwards into the snap up position is being overcome in FIG. 2B. In this regard, a voltage has been applied to second patterned layer 208 or the first patterned layer 204 to cause an attraction force (e.g., an electrostatic force, a piezoelectric force, or electromagnetic force) between the second patterned layer 208 and the first patterned layer 204 to overcome the mechanical bias of the actuation and anchor member 216. As such, the filter apparatus 200, operating as a microelectromechanical device, is in the snap down position and the beam portion 220 has moved into physical contact with base portion 230, i.e., the spacer 206 has moved into physical contact with the first patterned layer 204. Accordingly, the gap distance 214 of the gap 212 is reduced to, for example, zero. According to some example embodiments, with the spacer 206 now disposed on the first patterned layer 204, the spacer 206 may operate to cap the first patterned layer 204 in the same manner as the upper beam layer 210 caps the second patterned layer 208. Accordingly, the configuration of the filter apparatus 200 in the snap down position may operate to shift the resonant peaks of the second patterned layer 208 and the first patterned layer 204 such that the resonant peaks are aligned, and transmission at the selected wavelength is increased. As such, the actuation and anchor member 216 may form a micromechanical suspension between the beam portion 220 including the second patterned layer 208 and the base portion 230 including the first patterned layer 204 having a controllable gap distance 214 between the first patterned layer 204 and the second patterned layer 208 through application of a voltage in the form of, for example, an electrical waveform.

With reference to FIG. 5, a graph 500 is shown that describes the transmittance of the filter apparatus 200 with respect to wavelength in an example scenario. When the filter apparatus 200 is in the snap down position and the gap distance 214 is zero (i.e., $t_{Air}$ is 0), the filter apparatus 200 has the response 502 where the transmittance of the selected wavelength 10.6 μm is approximately 50%. In other words, radiant energy with a wavelength of 10.6 μm is passed through filter apparatus 200 with a transmittance of approximately 50%.

When the filter apparatus 200 is transitioned into the snap up position (i.e., $t_{Air}$ is 1.0 µm), the filter apparatus 200 has the response 506, and the transmittance is reduced to less than 2.5%. As such, in the snap up position, the radiant energy at wavelength 10.6 µm, relative to transmittance in the snap down position, is effectively blocked. This substantial difference in the transmittance at the selected wavelength provides for large amplitude modulation when actuating between the snap up and snap down positions. Additionally, the graph 500 includes a mid-snap position response 504, which shows that when the gap distance 214 is 0.5 µm (or half way between snap up and snap down), the response 504 has a maximum transmittance that is higher than the snap up position, but is still substantially below the maximum transmittance for the snap down position.

As can be seen in graph 500, the snap down response 502 may result in a bandpass filter with a relatively narrow spectral width. However, in order to achieve both high transmittance and narrow spectral width, some tradeoffs may need to be made. For example, in order to achieve a quality factor (Q) defined as the center wavelength $\lambda_0/\lambda_{3dB}$ over 10, the 50% transmittance was determined to be a selected optimization target. With this consideration in place, a filter apparatus 200, according to some example embodiments, may be designed Q values of about 15 in the MWIR and about 10 in the LWIR.

Thus, based on the foregoing, a filter apparatus 200 may be constructed and utilized that controls the transmittance of a selected wavelength of radiant energy. The control circuitry 110 may be configured to operate the filter apparatus 200, for example, within the context of a sensing or imaging system. In this regard, FIG. 6 provides a flowchart of an example method 600 that may be performed by the control circuitry 110 to operate the filter apparatus 200.

As such, at 602, the example method 600 includes controlling the second patterned layer 208 or the first patterned layer 204 to generate an attraction force (e.g., an electrostatic force, a piezoelectric force, or electromagnetic force) between the second patterned layer 208 and the first patterned layer 204. To do so, the control circuitry 110 may be configured to apply a voltage to either the second patterned layer 208 or the first patterned layer 204 such that a voltage potential difference is generated between the second patterned layer 208 and the first patterned layer 204. Example voltages that may be applied to generate the attraction force may range, for example, between about 23 to 44 volts to achieve complete pull-in. Further, by applying the voltage, the control circuitry 110 may be configured to generate the attraction force to move the second patterned layer 208 and the first patterned layer 204 into a snap down position such that a gap distance 214 of a gap 212 between the spacer 206 and the first patterned layer 204 is reduced (e.g., to zero) to cause a transmittance for radiant energy of a selected wavelength passing through the filter apparatus 200 to change, for example, by increasing to a first transmittance value (e.g., a relatively high transmittance value).

Further, at 604, the example method 600 may include controlling, by the control circuitry 110, the first patterned layer or the second patterned layer to move the first patterned layer and the second patterned layer into a snap up position. In this regard, the control circuitry 110 may be configured to remove the voltage or provide no voltage potential difference between the second patterned layer 208 and the first patterned layer 204. With no voltage potential difference between the second patterned layer 208 and the first patterned layer 204, no attraction force may be present and, for example, the mechanical bias applied by the actuation and anchor member 216 may urge the filter apparatus 200 into the snap up position. In this regard, the control circuitry 110 may be configured to control the filter apparatus 200 such that the gap distance 214 of the gap 212 between the spacer 206 and the first patterned layer 204 is increased (e.g., to a maximum distance) to cause a transmittance for radiant energy of the given wavelength passing through the filter apparatus 200 to change, for example, decrease to a second transmittance value (e.g., a low transmittance value). In this regard, the first transmittance value may be higher than the second transmittance value, further described herein.

According to some example embodiments, the control circuitry 110 may switch between the snap up and snap down positions, for example, at some operating frequency to, for example, modulate the radiant energy passing through the filter apparatus 200. In doing so, the control circuitry 110 may modulate the amplitude of the bandpass filter effect. Such modulation technique may be useful to implement in a number of applications and the MEMS structure may be capable of supporting a relatively high frequency modulation (e.g., greater than 1 kHz) of this type.

Having described the structure and the operation of example embodiments of a filter apparatus, reference is now made to FIG. 7 which describes an example method 700 for fabricating a filter apparatus, such as filter apparatus 200 or filter apparatus 101, according to some example embodiments. In this regard, the example method 700 may include providing a dielectric substrate (e.g., substrate 202) at 702. The substrate may, according to some example embodiments, be an undoped germanium wafer with an anti-reflective film.

Further, at 704, the example method 700 may include patterning a first metasurface layer (e.g., the first patterned layer 204) onto the dielectric substrate via, for example, lithography and liftoff. The first metasurface layer may include a metal such as, for example, gold. Alternatively, according to some example embodiments, the first metasurface layer may be formed of a dielectric. According to some example embodiments, this first metasurface layer may be patterned via e-beam or ultra-violet lithography and liftoff using, for example, a chromium/gold (5 nm/55 nm) liftoff.

At 706, the example method 700 may include depositing an actuation and anchor member layer onto the first metasurface layer. The actuation and anchor member, which may be formed of a metal, may be patterned via, for example, contact photolithography and chromium/platinum/gold liftoff (10 nm/20 nm/100 nm).

Further, at 708, the example method 700 may include coating the substrate, first metasurface layer, and the actuation and anchor member. In this regard, coating may include coating the substrate, first metasurface layer, and actuation and anchor member with an aluminum compound via atomic layer deposition. For example, coating may be performed with $Al_2O_3$ (100 nm) via atomic layer deposition at low temperatures, for example, due to relatively low temperature application to avoid impacting the anti-reflective coating of the dielectric substrate. The coating may be selected to have at least a threshold transmittance (e.g., 90%) at the selected wavelength. After atomic layer deposition, according to some example embodiments, patterning by contact photolithography and wet etching in Aluminum Etchant Type A may be performed. The process may be performed using either a wet etchant or dry etch process.

At 710, the example method 700 may include depositing a sacrificial gap layer on the, now coated, first metasurface layer. In this regard, the sacrificial gap layer may include titanium/silicon dioxide (SiO$_2$) (10 nm/1 µm), and may be deposited and patterned via, for example, e-beam or ultra-violet evaporation and liftoff. Subsequently, dimples may then be patterned and etched (e.g., 0.3 µm deep) into, for example, the sacrificial gap layer (e.g., the SiO$_2$ layer) to assist with later releasing the sacrificial gap layer to form the gap.

At 712, the example method 700 may include depositing, via sputtering and liftoff, a dielectric spacer layer (e.g., spacer 206) on the sacrificial gap layer. The dielectric spacer layer may include a dielectric, such as, for example, silicon.

Additionally, at 714, the example method 700 may include patterning a second metasurface layer (e.g., second patterned layer 208) via lithography and liftoff onto the dielectric spacer layer. The second metasurface layer may include a metal, such as, for example, gold. Alternatively, according to some example embodiments, the first metasurface layer may be formed of a dielectric, which may be the same dielectric material as the first metasurface layer. The second metasurface layer patterning may be performed via e-beam or ultra-violet lithography and chromium/gold evaporation and liftoff (5 nm/55 nm).

At 716, the example method 700 may include depositing a dielectric upper beam layer (e.g., upper beam layer 210) via sputtering and liftoff. The dielectric upper beam layer may include a dielectric, for example, silicon.

At 718, the example method 700 may include depositing beam metal. The beam metal, according to some example embodiments, may facilitate the ability of the structure to flex down to allow the beam portion (e.g., beam portion 104) to snap down and up, on a perimeter of the first metasurface layer. According to some example embodiments, the area of the beam metal may be minimized to allow for a maximum fill factor or maximum engagement of the first metasurface layer. The beam metal may be deposited on the beam portion (e.g., beam portion 220) which may include the dielectric upper beam layer, the second metasurface layer, and the dielectric spacer layer. In this regard, for example, the beam metal may be deposited as, for example, aluminum doped with 1% copper sputtered as a blanket film and patterned by a wet etching with Aluminum Etchant Type A.

At 720, the example method 700 may include removing the sacrificial gap layer. The sacrificial gap layer may be removed to release a microelectromechanical device form, for example, by at least the first metasurface layer and the second metasurface layer. In this regard, the beam portion may be released from the base portion, the base portion including the dielectric substrate and first metasurface layer. According to some example embodiments where the sacrificial gap layer is formed of SiO$_2$, the sacrificial gap layer may be removed, for example, via vapor-phase hydrofluoric acid using a reduce pressure, gas phase isotropic etch (e.g., PRIMAXX® MEMS-CET etcher), which may operate to avoid effecting the aluminum in the anti-reflective coating.

The description above provides for fabrication and operation of a filter apparatus that has been constructed using an out-of-plane vertical displacement approach. However, other fabrication and construction approaches are contemplated and may be utilized. For example, rather than the out-of-plane vertical displacement approach provided herein, an in-plane lateral displacement approach may alternatively be used to obtain similar results.

Now with reference to FIG. 8, a spectral imaging or sensing system 800 is provided. In this regard, the system 800 is similar to the system 100 with the exception that the filter apparatus 101 is replaced with a filter array 801 (e.g., a radiant energy filter array 801). The filter array 801 may include a plurality of filter apparatuses, also referred to as a plurality of filter elements, where each filter element is configured for operation with respect to a selected wavelength (which may be the same as or different from the wavelength of other filter elements) and is individually controllable to change each filter element's respective gap distance and associated transmittance to a respective selected wavelength. Further, according to some example embodiments, the filter elements may also differ with respect to polarization.

In this regard, the filter array 801 may include, for example, five filter elements, namely, filter element 802, filter element 804, filter element 806, filter element 808, and filter element 810. The filter elements 802, 804, 806, 808, 810 may be constructed or arranged as a planar array where each filter element is disposed in a common plane, that is plane 850. As such, the filter array 801 may be an integration of any number of filter elements formed on a two-dimensional array, possibly constructed on the same substrate. As a planar array, the thickness of the array can be the thickness of a single filter element, which includes designs for the MWIR and LWIR operation, and thereby implementing a configurable filter on a single device layer. Additionally, as a planar array, each filter element may be subjected to radiant energy that has not already passed through other filter elements thereby avoiding degradation in the received energy that might result in series oriented filters. In this configuration, the filter array 801 may embody a spatial array of individually controllable spectral filters to provide for multiband performance.

Although not shown in FIG. 8 (but refer to FIGS. 1A and 1B), each filter element 802, 804, 806, 808, 810 may be in communication with the control circuitry 110, and the control circuitry 110 may be configured to individually control each filter element 802, 804, 806, 808, 810. As such, the control circuitry 110 may be configured to provide a voltage to a selected filter element 802, 804, 806, 808, 810 to transition the selected filter element from a snap up position to a snap down position, thereby controlling the selected filter element to become a bandpass filter to the wavelength for the selected filter element. As such, depending on an application being implemented by the control circuitry 110, a desired wavelength may be selected and the control circuitry 110 may be configured to control the filter element associated with the desired wavelength to become a bandpass filter to that wavelength.

In this regard, in an example scenario, the control circuitry 110 may, for example, be performing a chemical composition analysis where radiant energy having a 7.8 µm wavelength is of interest. The filter element 808 has been designed with bi-layer metasurfaces as described herein to be a controllable bandpass filter centered at a wavelength of 7.8 µm. As such, the control circuitry 110 provides a voltage to filter element 808 to cause MEMS actuation in filter element 808 and put the filter element 808 in the snap down position. As a result, the filter element 808, having previous blocked radiant energy at the 7.8 µm wavelength due to being in the snap up position, becomes a bandpass filter to radiant energy at the 7.8 µm wavelength. The control circuitry 110 maintains the other filter elements in the snap up position to block all other radiant energy in the band. As such, radiant energy with a wavelength 136 of 7.8 µm is permitted to pass (as shown in FIG. 8) through the filter element 808 and reach the radiant energy sensor 120 for receipt and analysis by the control circuitry 110.

Similar to the filter apparatus 101, the filter array 801 may be implemented in systems configured in a transmission or reflection configuration. Further, the filter array 801 may be additionally or alternatively be implemented in association with an emitter (e.g., emitter 121) to operate on radiant energy provided by the emitter in a manner similar to system 107 described above. However, due to the configuration and control of the filter array 801, the filter array 801, may operate on a number of different corresponding selected wavelengths of radiant energy for respective filter elements 802, 804, 806, 808, 810

FIG. 9 shows a transmittance with respect wavelength chart 900 that shows the response graph for the filter array 801 if the filter elements 802, 804, 806, 808, 810 were operating in the bandpass/snap down mode. In this regard, it can be seen that the configuration of the filter array 801 provides flexibility across the band (e.g., the IR band) to select a wavelength of interest and then control the filter array 801 to pass radiant energy at that selected wavelength. With reference to the chart 900, it is shown that, for example filter element 802 may be designed for a 3.8 μm wavelength as shown by graph 902, filter element 804 may be designed for a 4.5 μm wavelength as shown by graph 904, filter element 806 may be designed for a 6.3 μm wavelength as shown by graph 906, filter element 808 may be designed for a 7.8 μm wavelength as shown by graph 908, and filter element 810 may be designed for a 11.6 μm wavelength as shown by graph 910.

FIG. 10 provides a flowchart of an example method 1000 that may be performed by the control circuitry 110 to control the operation of the filter array 801. In this regard, the example method 1000 may include, at 1002, determining a wavelength of interest for an application being implemented. In this regard, the application may be any example application described herein or that would benefit from the use of the filter array 801, such as spectral analysis for chemical identification. At 1004, the example method 1000 may include determining a target filter element (e.g., a first filter element) of the filter array that is configured to pass the wavelength of interest. In this regard, the control circuitry 110 may include a lookup table or other data structure or relationship to determine which filter element is designed for operation with respect to which wavelengths. As such, the control circuitry 110 may access the memory to retrieve an identification of the target filter element for the wavelength of interest.

The example method 1000 may include, at 1004, controlling the target filter element (as described herein) to transition into a bandpass mode (i.e., snap down position) and controlling other filter elements (e.g., a second filter element) to maintain a blocking mode (i.e., snap up position). With the target filter element in the bandpass mode, radiant energy of the wavelength of interest may pass through the target filter element to be received by the radiant energy sensor (e.g., radiant energy sensor 120).

Accordingly, example method 1000 may include, at 1008, receiving, at the control circuitry 110, signals from the radiant energy sensor indicative of the radiant energy of the wavelength of interest (e.g., amplitude data). Further, at 1010, the example method 1000 may include performing signal processing on the signals indicative of the radiant energy of the wavelength of interest to determine an output for the application being implemented.

According to some example embodiments, the example method 1000, or portions thereof, may be performed iteratively across the filter array 801 where each wavelength for a filter element becomes the desired wavelength. In this manner, the control circuitry 110 may be configured to perform a sweep of a desired band (e.g., the IR band or the MWIR and LWIR bands).

Further, the control circuitry 110 may be configured to operate the filter array 801 in a number of different operational approaches. For example, the control circuitry 110 may be configured to operate the filter array 801 as a dynamic reconfigurable multimode bandpass filter that enables a staring mode for modulated or continuous wave operation. Alternatively, the control circuitry 110 may be configured to operate the filter array 801 as a dynamic single mode filter that sweeps across a spectrum of interest to identify radiant energy with wavelengths of interest within the spectrum. Alternatively, the control circuitry 110 may be configured to operate the filter array 801 as a sparse array to, for example, perform single pixel multispectral imaging.

As such, in view of the foregoing, an example system is provided that includes a radiant energy filter array including a plurality of filter elements arranged in a common plane. In this regard, the plurality of filter elements may include a first filter element and a second filter element. The example system may further include control circuitry in communication with the first filter element and the second filter element. The control circuitry may be configured to control the first filter element the second filter. The example system may also include a radiant energy sensor positioned to receive radiant energy passing through the radiant energy filter array.

According to some example embodiments, the first filter element may include a first microelectromechanical device. The first microelectromechanical device may include a first metasurface and a second metasurface. The first metasurface may be movable towards the second metasurface via an attraction (e.g., an electrostatic force, a piezoelectric force, or electromagnetic force) controlled by the control circuitry to change a transmittance for radiant energy of a first wavelength and controllably pass radiant energy of the first wavelength to the radiant energy sensor. Additionally, the second filter element may include a second microelectromechanical device. The second microelectromechanical device may include a third metasurface and a fourth metasurface. The third metasurface may be movable towards the fourth metasurface via an attraction (e.g., an electrostatic force, a piezoelectric force, or electromagnetic force) controlled by the control circuitry to change a transmittance for radiant energy of a second wavelength and controllably pass radiant energy of the second wavelength to the radiant energy sensor.

According to some example embodiments, the first microelectromechanical device of the first filter element may include a substrate, the first metasurface coupled to the substrate, a spacer, and the second metasurface coupled to the spacer. The first metasurface may include a first pattern and the second metasurface including a second pattern. According to some example embodiments, the substrate may include germanium, the spacer may include silicon, the first metasurface may include gold, and the second metasurface may include gold. Further, according to some example embodiments, first metasurface and the second metasurface may include respective arrays of first shaped pattern features corresponding to the first wavelength, and the third metasurface and the fourth metasurface may include respective arrays of second shaped pattern features corresponding to the second wavelength. According to some example embodiments, the first metasurface and the second metasurface may include respective arrays of first shaped pattern features corresponding to the first wavelength. Further, according to some example embodiments, the first metasurface and the second metasurface include respective arrays of cross-shaped surface features corresponding to the first wavelength, the cross-shaped pattern features having a dimension of between 0.5 μm and 2.2 μm. According to some example embodiments, the first wavelength and the second wavelength are between 8 and 15 μm.

Many modifications and other embodiments of the invention set forth herein will come to mind to one skilled in the art to which the present application pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

What is claimed is:

1. An apparatus comprising:
    a substrate;
    a first patterned layer coupled to the substrate and comprising a first pattern, the first patterned layer comprising a first metasurface;
    a second patterned layer disposed separately from the substrate and the first patterned layer and comprising a second pattern, the second patterned layer comprising a second metasurface;
    a dielectric spacer through which radiant energy received by the apparatus passes, the dielectric spacer being coupled to the second patterned layer and disposed within a gap between the first patterned layer and the second patterned layer such that the dielectric spacer moves with the second pattern layer relative to the first patterned layer, the dielectric spacer providing rigidity to the second patterned layer to maintain planar registration between the second patterned layer and the first patterned layer when the first patterned layer and the second patterned layer are in a first position and a second position; and
    control circuitry in communication with the first patterned layer and the second patterned layer, the control circuitry configured to control the first patterned layer or the second patterned layer to move the first patterned layer and the second patterned layer between the first position and the second position such that a gap distance between the first patterned layer and the second patterned layer is changed to cause a transmittance of radiant energy of a selected wavelength to change from a first transmittance value to a second transmittance value.

2. The apparatus of claim 1, wherein the control circuitry is configured to control the first patterned layer or the second patterned layer to change the gap distance by reducing the gap distance from a first gap distance corresponding to the first transmittance value to a second gap distance corresponding to the second transmittance value; and
    wherein the first transmittance value is less than the second transmittance value.

3. The apparatus of claim 1, wherein the control circuitry is configured to control the first patterned layer or the second patterned layer to change the gap distance by increasing the gap distance from a first gap distance corresponding to the first transmittance value to a second gap distance corresponding to the second transmittance value; and
    wherein the first transmittance value is greater than the second transmittance value.

4. The apparatus of claim 1, wherein the control circuitry is configured to control the first patterned layer or the second patterned layer to repeatedly change the gap distance between a first gap distance and a second gap distance to cause the transmittance for radiant energy of the selected wavelength to change between the first transmittance value and the second transmittance value.

5. The apparatus of claim 1, wherein the first pattern and the second pattern are the same pattern.

6. The apparatus of claim 1, wherein the second patterned layer is supported above the first patterned layer by a micromechanical suspension, with the gap distance controllable by an electrical waveform.

7. The apparatus of claim 1, further comprising an upper beam layer coupled to a first surface of the first second patterned layer;
    wherein the dielectric spacer is coupled to a second surface of the second patterned layer, the second surface of the second patterned layer being opposite the first surface of the second patterned layer.

8. The apparatus of claim 1, wherein the control circuitry is further configured to control the first patterned layer or the second patterned layer to move via an electrostatic force applied between the first patterned layer and the second patterned layer.

9. The apparatus of claim 1, wherein the first patterned layer and the second patterned layer comprise an array of unit cells including respective pattern features that have a dimension that is equal to or less than the selected wavelength.

10. The apparatus of claim 1, wherein the first patterned layer and the second patterned layer comprise an array of unit cells including respective pattern features configured to filter radiant energy having a selected linear or circular polarization.

11. The apparatus of claim 1, wherein the first patterned layer comprises a first metal and the second patterned layer comprises a second metal, and the first patterned layer and the second patterned layer are configured to operate as a microelectromechanical device.

12. The apparatus of claim 1, wherein the first patterned layer comprises a first dielectric material and the second patterned layer comprises a second dielectric material, and the first patterned layer and the second patterned layer are configured to operate as a microelectromechanical device.

13. The apparatus of claim 1, wherein the second patterned layer is mechanically biased toward a snap up position.

14. The apparatus of claim 1, wherein the control circuitry is configured to control the second patterned layer to move from the first position and into the second position to reduce the gap distance between the first patterned layer and the second patterned layer from a first gap distance corresponding to the first transmittance value to a second gap distance corresponding to the second transmittance value;

- wherein a thickness of the dielectric spacer is based on the selected wavelength;
- wherein the second gap distance is the thickness of the dielectric spacer such that, in the second position, the dielectric spacer is in physical contact with the first patterned layer;
- wherein the first gap distance is larger than the thickness of the dielectric spacer such that, in the first position, the dielectric spacer is not in physical contact with the first patterned layer; and
- wherein the first transmittance value is less than the second transmittance value.

* * * * *